US008645216B2

(12) United States Patent
Murphy et al.

(10) Patent No.: US 8,645,216 B2
(45) Date of Patent: *Feb. 4, 2014

(54) ENROLLMENT APPARATUS, SYSTEM, AND METHOD

(75) Inventors: Mike Murphy, Salem, NH (US); Paul Yarin, Los Angeles, CA (US); Eric Metois, Arlington, MA (US); Will Crosby, Jamaica Plain, MA (US); Wilson Pearce, Orleans (CA); Mark Durbin, Banbury (GB)

(73) Assignee: Proiam, LLC, Salem, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/410,877

(22) Filed: Mar. 2, 2012

(65) Prior Publication Data
US 2012/0162413 A1 Jun. 28, 2012

Related U.S. Application Data

(63) Continuation of application No. 12/324,204, filed on Nov. 26, 2008, now Pat. No. 8,140,395.

(60) Provisional application No. 60/990,115, filed on Nov. 26, 2007, provisional application No. 61/082,762, filed on Jul. 22, 2008.

(51) Int. Cl.
*G06G 1/12* (2006.01)
*G06Q 20/00* (2012.01)

(52) U.S. Cl.
USPC ............. 705/21; 177/116; 235/453; 235/454; 226/10; 226/168

(58) Field of Classification Search
None
See application file for complete search history.

(56) References Cited

U.S. PATENT DOCUMENTS

| 5,602,742 | A | * | 2/1997 | Solondz et al. | 705/410 |
| 5,770,841 | A | * | 6/1998 | Moed et al. | 235/375 |
| 5,966,457 | A | * | 10/1999 | Lemelson | 382/141 |
| 2003/0038179 | A1 | * | 2/2003 | Tsikos et al. | 235/454 |

FOREIGN PATENT DOCUMENTS

JP 11094535 A * 4/1999 ............. G01B 21/02

* cited by examiner

*Primary Examiner* — Luna Champagne
(74) *Attorney, Agent, or Firm* — Foley & Lardner LLP

(57) ABSTRACT

An apparatus for enrolling a package is disclosed including: a receiving surface for receiving the package; at least one weight sensor in communication with the receiving surface which generates a weight signal indicative of the weight of the package; at least one video camera which generates a video signal indicative of an image of the package on the receiving surface; and a processor in communication with the at least one weight sensor and the at least one video camera. The processor includes: a weight module which produces, in response to the weight signal, weight data indicative of the weight of the package; and a dimension capture module which produces, in response to the video signal, dimension data indicative of the size of the package. In some embodiments, the processor further includes a recognition module which produces, in response to the video signal, character data indicative of one or more characters present on the package.

20 Claims, 27 Drawing Sheets

| SUBSYSTEM | SPEC | TARGET | ACTUAL |
|---|---|---|---|
| IMAGER | RESOLUTION | 100 - 200dpi | 138dpi |
| | IMAGING AREA | >=8x6" | 10.5 x 15.9" |
| | MAX MEASURABLE PARCEL LENGTH | >=18" | 15.5" |
| | MAX MEASURABLE PARCEL WIDTH | >=13" | 10.5" |
| | | | |
| RANGEFINDER | HEIGHT RESOLUTION | | 0.25" |
| | MAX MEASURABLE PARCEL HEIGHT | >=7" | 12" |
| | | | |
| LOAD CELL | MAX MEASURABLE WEIGHT | >=15 lbs | 22lbs. |
| | WEIGHT RESOLUTION (UNDER 1 lb) | <=0.5 oz | 0.5 oz. |
| | WEIGHT RESOLUTION (OVER 1 lb) | <=2.0 oz | 0.5 oz. |
| | WEIGHT ACCURACY | <=1% FULL SCALE | 0.5% FULL SCALE |
| | | | |
| UNIT DIMENSIONS | WEIGHT | <=50 lbs | 30lbs. |
| | LENGTH | <=20" | 2.2" (BASE ONLY 20") |
| | WIDTH | <=20" | 14" |
| | HEIGTH | <=10" | 24" (BASE ONLY 7") |

| | |
|---|---|
| SURFACE MATERIAL | CLEAR TEMPERED GLASS 1/4" |
| INDICATORS | 2x20 CHARACTER VACUUM FLUORESCENT DISPLAY, BEEPER |
| CONTROLS | BUTTONS FOR PC POWER, UNITS, TARE |
| SUPPORTED UNITS | METRIC (kg/cm), IMPERIAL (ounces/inches), RAW UNITS |
| PC CONNECTIVITY | USB 2.0x3 |
| PC CONFIGURATION | CORE 2 DUO 2.4Ghz, 4gb RAM, 100GB HD, WinXP SP2 |
| PC POWER REQUIREMENTS | 100-240VAC, 50-60Hz. 1.5A |
| SCALE LIGHTING POWER REQUIREMENTS | 100-240VAC, 50-60Hz. 0.3A |

FIG. 3

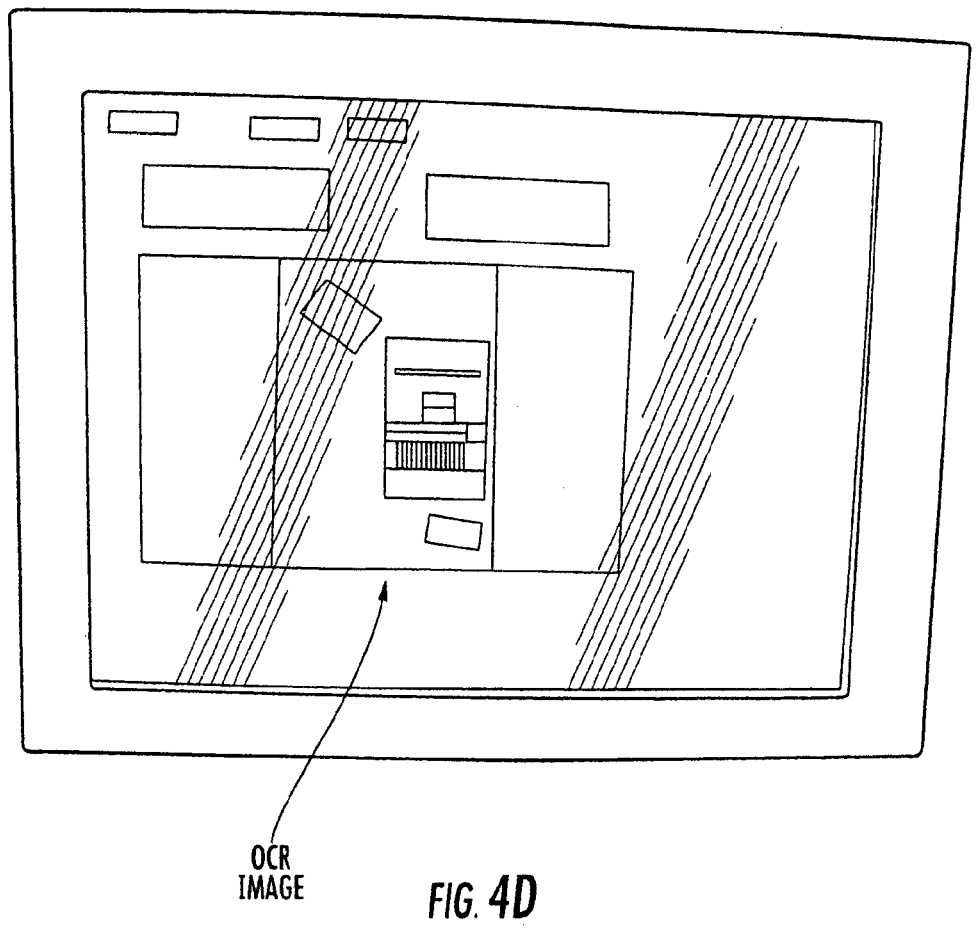
OCR IMAGE    FIG. 4D

ENROLLMENT APPARATUS, SYSTEM, AND METHOD

CROSS REFERENCE TO RELATED APPLICATION

This application is a continuation of U.S. patent application Ser. No. 12/324,204, filed Nov. 26, 2008, which claims benefit of U.S. Provisional Application Ser. No. 60/990,115 filed Nov. 26, 2007 and U.S. Provisional Application Ser. No. 61/082,762 filed Jul. 22, 2008, the contents of each of which are incorporated herein by reference in their entirety.

BACKGROUND

In industries such as the postal, courier, and supply chain industries, package objects (e.g. letters or parcels) are enrolled into a system for tracking and/or delivery. For example, items presented at post offices and related locations for onward delivery currently require the counter staff and/or customers to manually enter data regarding address information, weight, dimensional information, and other shipment characteristics. The manual collection of this information is costly, in terms of time, error rates on manual data entry, plus errors in correctly rating items. Retail locations are also typically required to maintain space for both the scale and the metering devices.

Some postal authorities mandate the capture of additional information for items being accepted across post office counters. It is now a common requirement that dimensions, destination, and sender information be captured. Complexity is increasing while the ability to maintain a well trained counter staff is declining. Increasing use of franchise points of presence is causing compliance, training, accounting, and security problems.

For example, a customer may bring a package to a post office point of sale. A postal employee will receive the package, gather information related to the package (e.g. intended destination, package dimensions, package weight, type of delivery, desired delivery date, customer information, payment information etc.). In typical situations, the information is gathered manually, and in a highly linear and labor intensive fashion. For example, in a typical transaction, a postal employee might receive a package, weigh it, measure its dimensions with a tape measure, enter this information into a computer, read a label on the package, enter delivery address information found on this label, query the customer about desired delivery type and date, enter this information into a computer, provide pricing information to the customer, accept payment, etc.

Improvement in enrollment efficiency could provide substantial savings in, for example, labor costs, error costs, and time.

SUMMARY

The inventors have realized that enrollment efficiency can be increased by automatically, and substantially simultaneously collecting multiple types of information about an item being enrolled in a delivery system.

In one aspect, an enrollment device is disclosed which will replace both the traditional weigh scale, as well as the postage meter, which are currently found at induction points for Postal, Courier and Supply Chain operations. A combination of Optical Character Recognition (OCR) and dimension capture (e.g. using optical dimension capture and/or ultrasonic range-finding technologies) is used to capture and convert addressing, payment, account and shipment related data, plus weight and dimensional information (when relevant) from packages, letters, and documentation which are placed on, in, or near the device.

Such a device provides a "front end" mechanism for entering shipment related data into a business environment (e.g. postal environment) and simultaneously automates the rating and data collection process for accepting goods and services, automates the process of capturing dimensional data in the course of rating shipments at point of induction into the business environment, reduces or eliminates the requirement for a separate weigh scale, reduces or eliminates the requirement for a separate metering device, and presents data to the organization's back-end and enterprise systems at point of induction.

In one aspect, an apparatus for enrolling a package is disclosed including: a receiving surface for receiving the package; at least one weight sensor in communication with the receiving surface which generates a weight signal indicative of the weight of the package; at least one video camera which generates a video signal indicative of an image of the package on the receiving surface; and a processor in communication with the at least one weight sensor and the at least one video camera. The processor includes: a weight module which produces, in response to the weight signal, weight data indicative of the weight of the package; and a dimension capture module which produces, in response to the video signal, dimension data indicative of the size of the package. In some embodiments, the processor further includes a recognition module which produces, in response to the video signal, character data indicative of one or more characters present on the package.

Some embodiments include a range finder sensor in communication with the processor which produces a range finder signal indicative of the size of the package, and where the dimension capture module produces, in response to the video signal and the range finder signal, dimension data indicative of the size of the package. In some embodiments, the dimension capture module produces, in response to the video signal, dimension data indicative of the size of the package along two axes lying in a plane substantially parallel to the receiving surface, and produces, in response to the range finder signal, dimension data indicative of the size of the package along an axis transverse to the plane.

In some embodiments, the dimension capture module includes a tracking module which produces, in response to the video signal, tracking data indicative of the presence and location of the package on the receiving surface.

In some embodiments, the at least one camera selectively operates in a first mode characterized by a relatively large field of view to generate a video signal characterized by a relatively low resolution and relatively high frame rate, and a second mode characterized by a relatively small field of view to generate a video signal characterized by a relatively high resolution and a relatively low frame rate. In some embodiments, the tracking module produces, in response to the video signal generated by the at least one camera in the first mode, tracking data indicative of the presence and location of the package on the receiving surface. The recognition module produces, in response to the video signal generated by the at least one camera in the second mode, character data indicative of one or more characters present on the package.

In some embodiments, the dimension capture module includes an edge finder module which produces, in response to the video signal, edge data indicative of the location of one or more edges on the package.

In some embodiments, the dimension capture module includes one or more of: a frame differencing module which generates difference images from two or more images of the video signal; and a color masking module configured to generate information indicative of the presence or location of the package based on color information from the video signal.

In some embodiments, the dimension capture module includes a Hough transformation module which applies the Hough transformation to one or more images from the video signal, and analyzes the transformed images to determine information indicative of the size or location of edges on the package. Some embodiments further include a rectangle tracking module configured to track the location of a substantially rectangular package based on the information indicative of the size or location of edges on the package.

In some embodiments, the recognition module includes: an image processing module for processing one or more images from the video signal; and an analysis module which analyzes the one or more processed images to produce the character data indicative of one or more characters present on the package.

In some embodiments, the image processing module includes at least one of: a color manipulating module for modifying the color of the one or more images; a linear filter module for applying a linear image filter to the one or more images; and a morphological filter module for applying one or more morphological operations to the one or more images.

In some embodiments, the image processing module includes an image segmentation module for segmenting the one or more images into one or more regions of interest based on the content of the images.

In some embodiments, the image processing module includes an image rotation module which rotates at least a portion of the one or more images. In some embodiments, the image rotation module is in communication with the dimension capture module, and rotates at least a portion of the one or more images based on information from the dimension capture module indicative of the location of the package.

In some embodiments, the at least one camera include at least two cameras, each generating a respective video signal, and where the cameras have least partially overlapping fields of view. The processor includes an image stitching module which, in response to the respective video signals, combines overlapping images from the at least two cameras to produce a single image of the combined field of view of the cameras.

In some embodiments, each of the at least one cameras has a respective field of view. Substantially all locations on the receiving surface fall within the respective field of view. In some embodiments, the at least one camera consists of a single camera.

In some embodiments, the receiving surface is at least partially transparent, and where the at least one camera is positioned below the receiving surface to image the package through the receiving surface.

In some embodiments, the at least one camera is positioned above the receiving surface.

In some embodiments, the receiving surface includes at least on indicia for aligning or focusing the at least one camera.

In some embodiments, the at least one camera includes an auto focus.

Some embodiments include an integrated housing including the receiving surface and processor.

Some embodiments include an arm extending between a proximal end connected to the housing and a distal end positioned above the receiving surface, the distal end including at least one chosen from the group consisting of: a range finder, and the at least one camera.

Some embodiments include an RFID reader, and/or a bar code reader.

In some embodiments, the rangefinder includes at least one of: an ultrasonic range finder, a RADAR range finder, a LIDAR range finder, a laser range finder, an LED based range finder, a mechanical range finder, and an optical range finder.

In some embodiments, the at least one weight sensor includes: a load cell, a MEMs device, a piezoelectric device, a spring scale, and a balance scale.

In some embodiments, the data indicative of one or more characters present on the package include data indicative of at least one chosen from the group consisting of: an alphanumeric character, a symbol, a postal code, a post mark, a bar code, and a two dimensional bar code.

Some embodiments include a postal meter in communication with the processor and/or a printer in communication with the processor.

In another aspect, a method of enrolling a package is disclosed including: providing an enrollment apparatus of the type described herein, using the enrollment apparatus to determine information indicative of the size of the package; using the enrollment apparatus to determine information indicative of the size of the package indicative of one or more characters present on the package; and outputting the information indicative of the weight, size, and one or more characters present on the package.

In some embodiments, the information indicative of the weight, size, and one or more characters present on the package, respectively, are determined substantially in parallel.

In another aspect, a system is disclosed including: an enrollment apparatus of the type described herein and a package management system. The enrollment apparatus is in communication with the package management system to provide information indicative of the weight, size, and one or more characters present on the package.

In some embodiments, the package management system includes at least one of: a package delivery system, a supply chain management system, an inventory management system, and a chain of custody management system.

In some embodiments, the package management system includes a point of sale unit, and where the point of sale unit generates and displays, in response to the information indicative of the weight, size, and one or more characters present on the package, information indicative of one or more available service options. In some embodiments, the point of sale unit includes an input unit for receiving information from a user; and a service unit for providing information indicative of one or more available service options based on the information from the user and information indicative of the weight, size, and one or more characters present on the package. In some embodiments, where the input unit includes the enrollment apparatus.

In some embodiments, the input unit receives a series of instructions from the user, and the service unit includes a backwards chaining logic unit which dynamically determines and displays available service options based on the series of instructions and based information indicative of the weight, size, and one or more characters present on the package.

In some embodiments, the package management system includes a point of service unit, and further including a handler module for facilitating communication between the enrollment apparatus and the point of service unit.

As used herein, the "location" of a package refers to its position in space and its orientation.

Various embodiments may include any of the features described above, either alone or in any combination.

The details of one or more embodiments are set forth in the accompanying drawings and the description below. Other features and advantages will be apparent from the description and drawings.

BRIEF DESCRIPTION OF THE DRAWINGS

FIG. 3 shows exemplary specifications for an enrollment device.

FIGS. 4a-4e are photographs of a working example of an enrollment device.

DETAILED DESCRIPTION

Figure 1A:
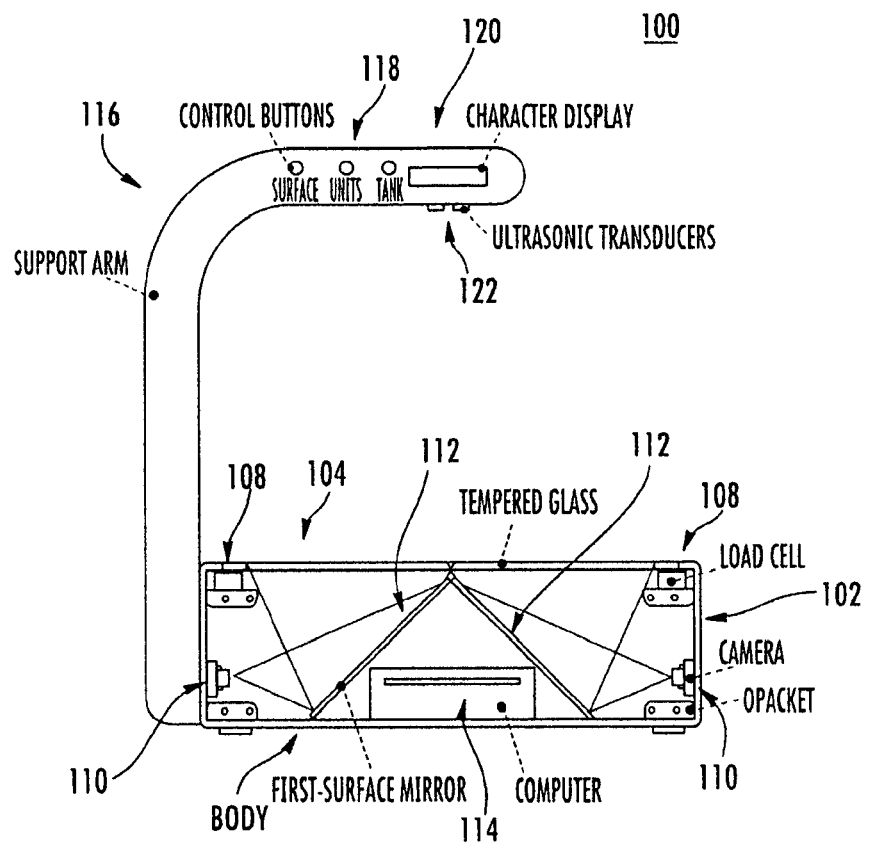
FIGS. 1a-1c show views of an enrollment device.
Figure 1B:
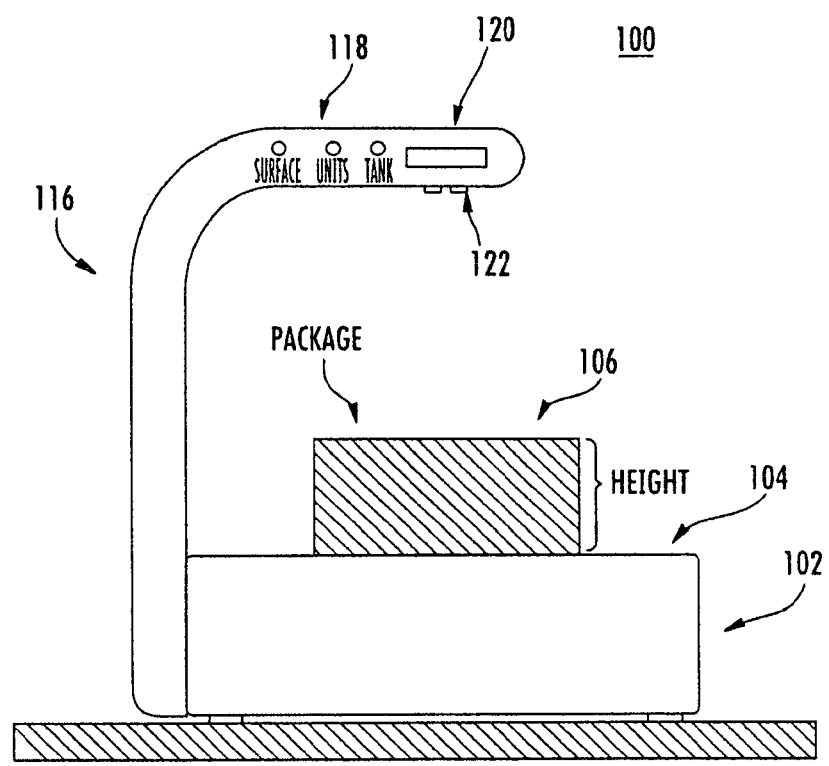
Figure 1C:
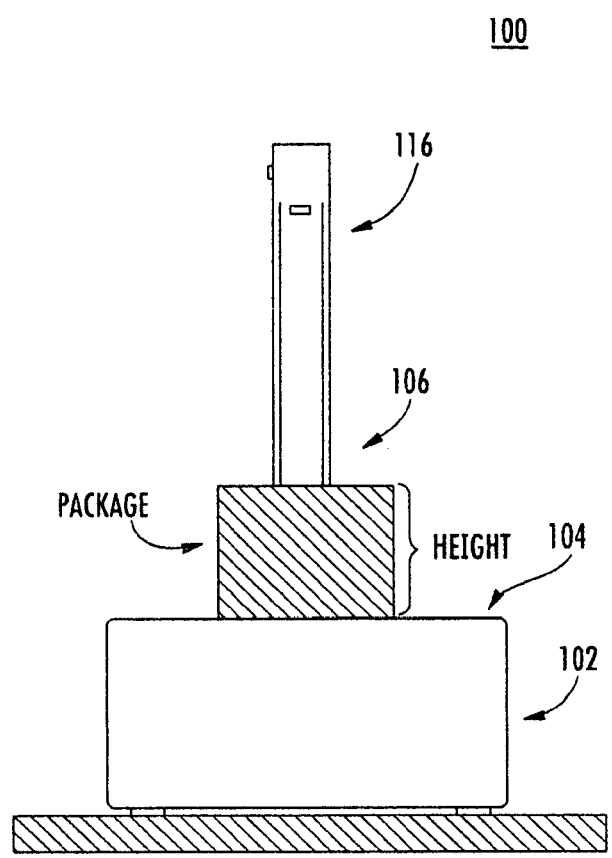

FIGS. 1a, 1b, and 1c illustrate an exemplary embodiment of an enrollment device 100. Referring to the cutaway view of FIG. 1a, the device body 102 (also referred to herein as "main enclosure") includes a transparent tempered glass surface 104 for receiving a package 106 (shown in FIGS. 1b and 1c). Load cells 108 (e.g. solid state load cells) are located at the corners of the glass surface and provide weight information for items placed on the surface 104.

The device body 102 includes two cameras 110. First and second surface mirrors 112 are disposed to direct an image of a package placed on the surface to the cameras. The marginal rays of the camera/mirror systems are indicated in FIG. 1a. As shown, the combined field of view of the two cameras 110 substantially covers the area of the glass surface 104, allowing image capture of package 106 placed at an arbitrary position on the glass surface 104.

The device body also includes a computer processor 114 which may be coupled to the various components of the device and/or to external systems or devices. For example, the computer processor 114 may be an x86 platform capable of running Linux or embedded Microsoft Windows products. In various embodiments, this computer may run the internal "firmware" for the device as well as support application facilities such as a Web Server and postal rating (i.e. pricing/metering) engine.

In some embodiments, the device body 102 includes one or more lighting modules (not shown), such as light emitting diode modules, to illuminate the package placed on the glass surface.

A support arm 116 (also referred to herein as an "extension arm") extends above the surface 104. The support arm 116 includes control buttons 118 (e.g. power control, measurement units control, scale tare, etc.). A display 120 provides information to the user or users (e.g. postal clerk and/or customer) and may include for example, a character display (e.g. LCD display). The support arm 116 also includes an ultrasonic transducer rangefinder 122 which operates to capture one or more dimensions of package 106 placed on the glass surface 104 (e.g. the height dimension as shown in FIGS. 1b and 1c). In some embodiments, the device 100 may include additional or alternative rangefinders (e.g. infrared rangefinder, mechanical rangefinder, laser rangefinder, radar range finder, LED based rangefinder, one or more cameras, etc.)

Figure 2:
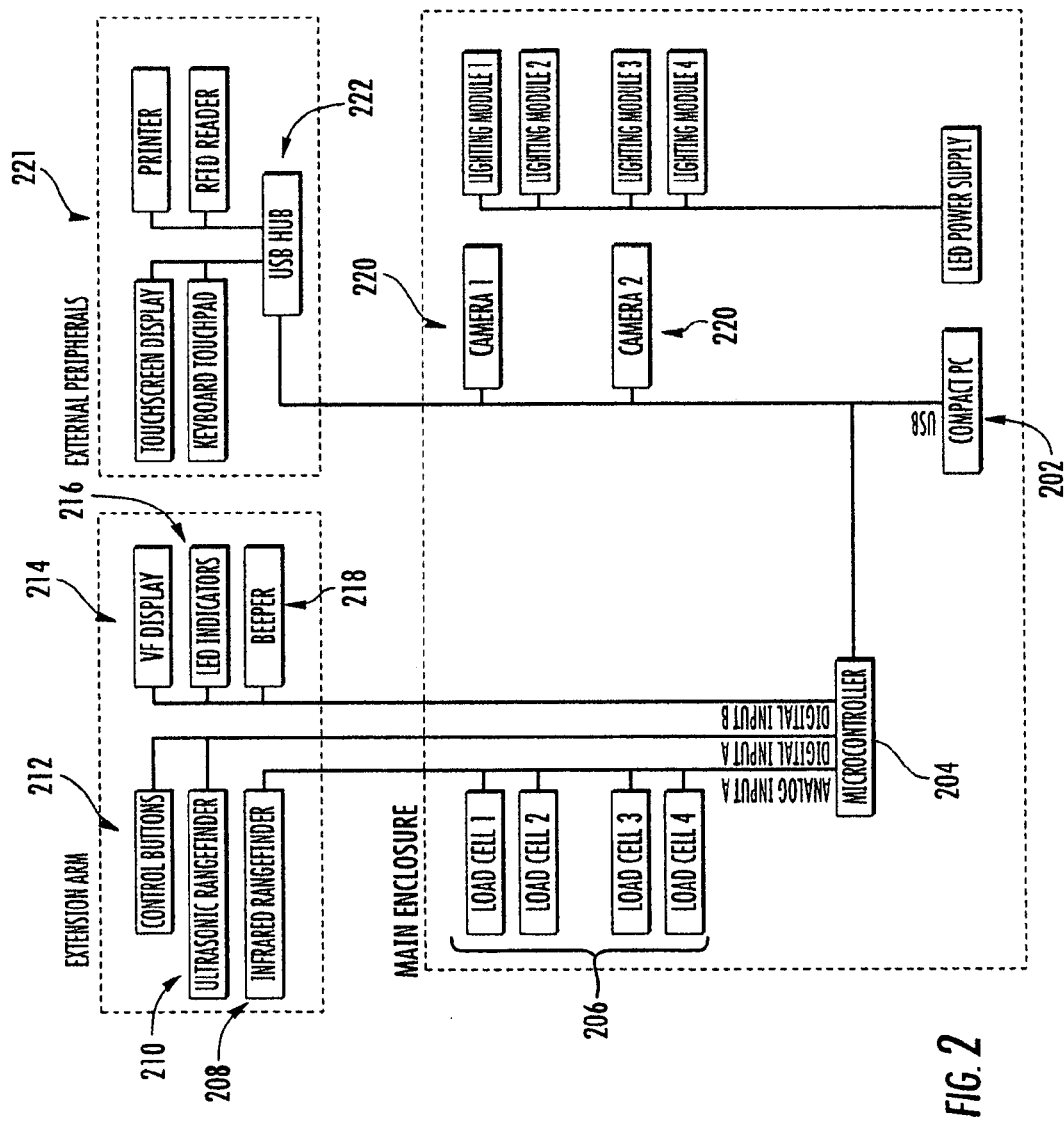
FIG. 2 shows and illustration of the connections and control of the various components of an enrollment device.

FIG. 2 illustrates the connections and control of the various components of an enrollment device of the type described above. Compact personal computer (PC) 202 (e.g. comprising processor 114) is connected to a microcontroller 204. The microcontroller receives analog inputs from four load cells 206 and an infrared rangefinder 208, along with digital inputs from an ultrasonic rangefinder 210 and user control buttons 212. Information from these inputs can be passed back to the compact PC 202 for processing. The microcontroller 204 also provides digital control outputs to a display 214, LED indicators 216, and a beeper 218. The compact PC 202 receives image information from each of two cameras 220 for processing (e.g. image processing, OCR, dimension capture, etc). The compact PC 202 is further connected to various peripherals 221 via a connection such as a universal serial bus (USB) hub 222. The peripherals may include a printer, an RFID reader capable of receiving signals from an RFID tag on the package, and various displays and controllers (e.g. keyboard, touch screen display, touchpad, etc.).

As will be understood by one skilled in the art, FIG. 3 lists various parameters and specifications for a working example of an enrollment device of the type described above, along with target performance specifications corresponding to typical applications. Note that the majority of performance characteristics of the working example are in general compliance with target values.

Figure 4A:
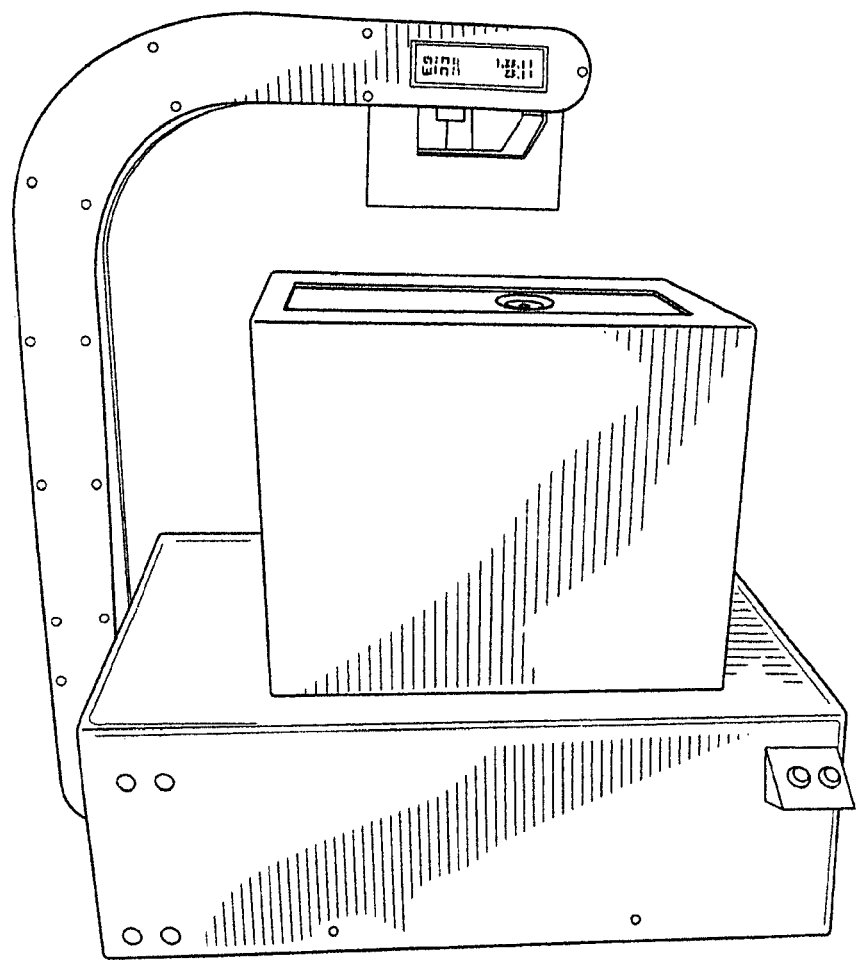
Figure 4B:
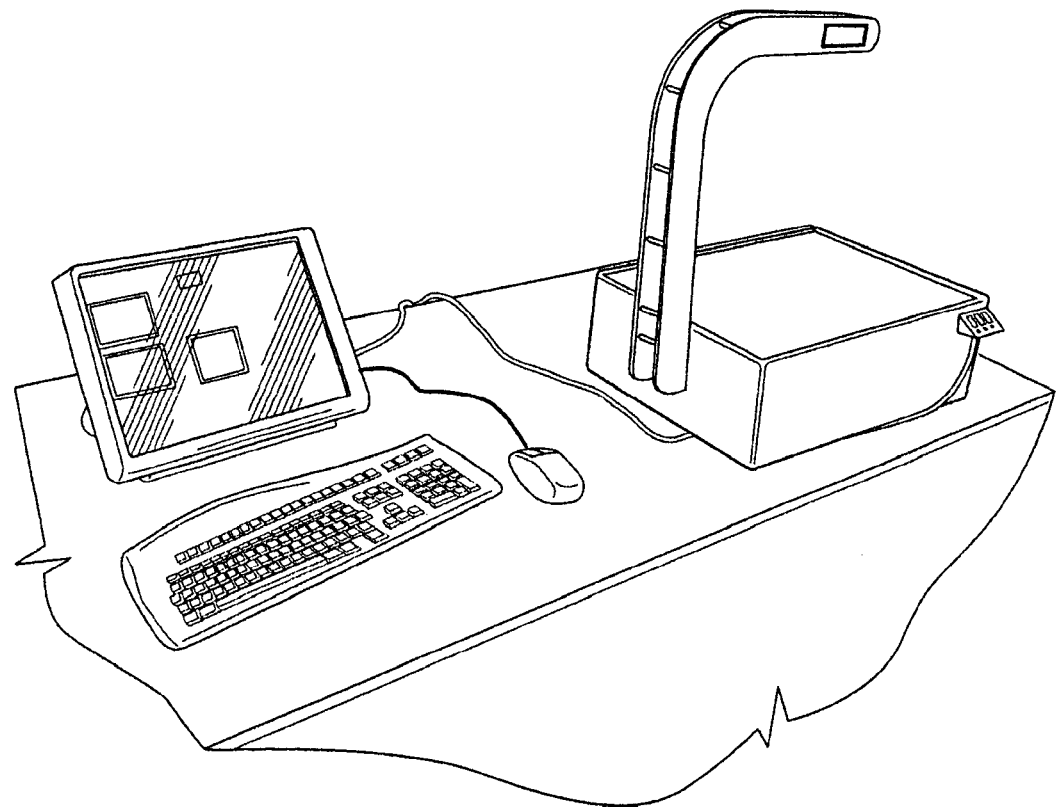
Figure 4C:
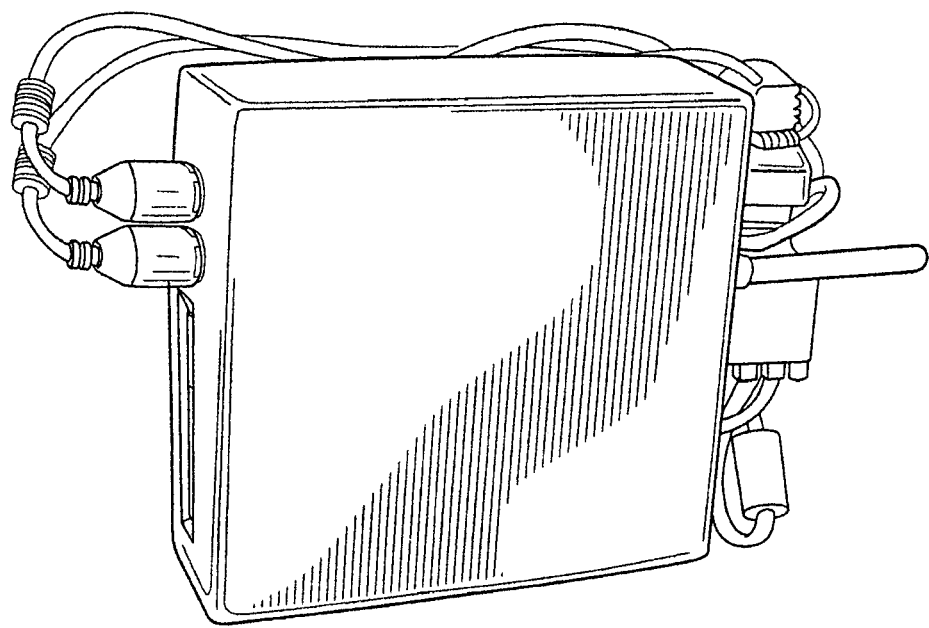
Figure 4E:
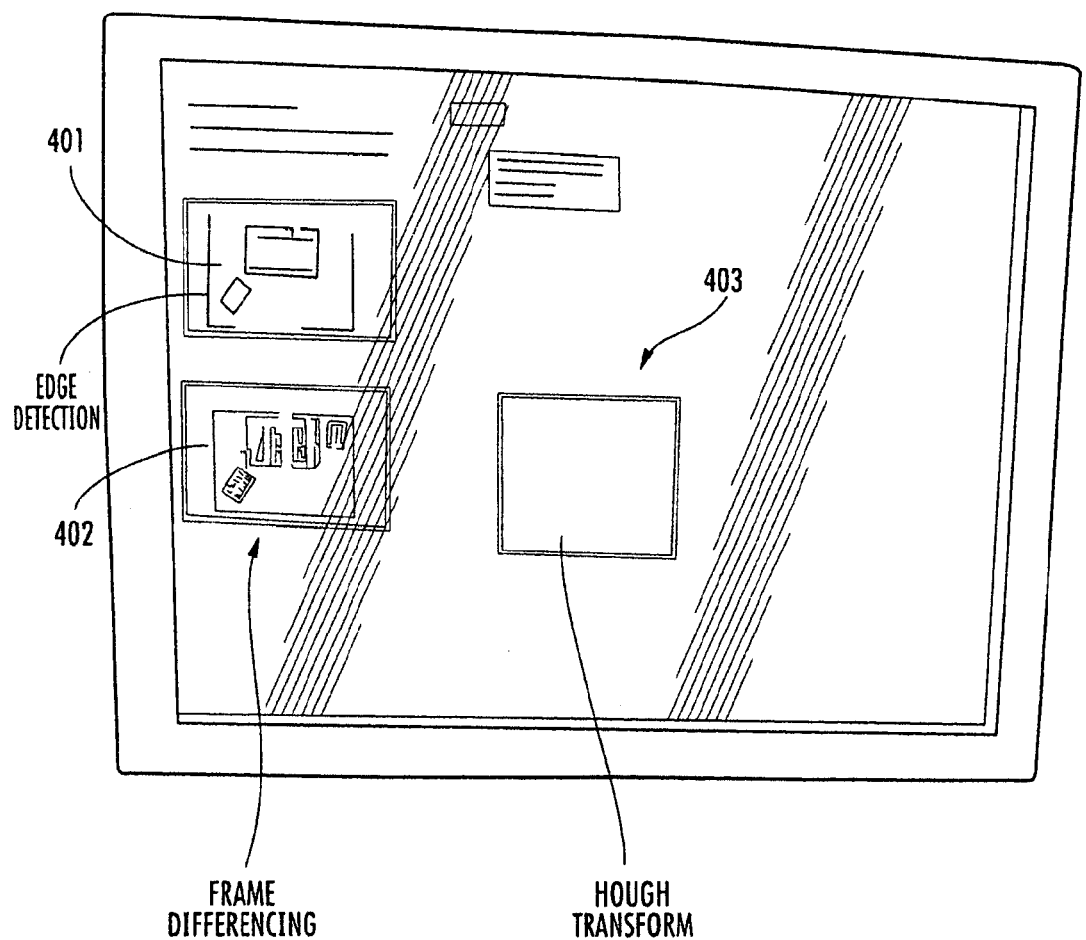

FIGS. 4a-4e are photographs of a working example of an enrollment device of the type described above. FIG. 4a shows the device with a package placed on the glass surface. FIG. 4b shows the device along with display and control peripherals. FIG. 4c shows a compact PC integrated into the main enclosure. FIGS. 4d and 4e show examples of image processing, dimension capture, and OCR, as will be discussed in greater detail below.

Figure 5:
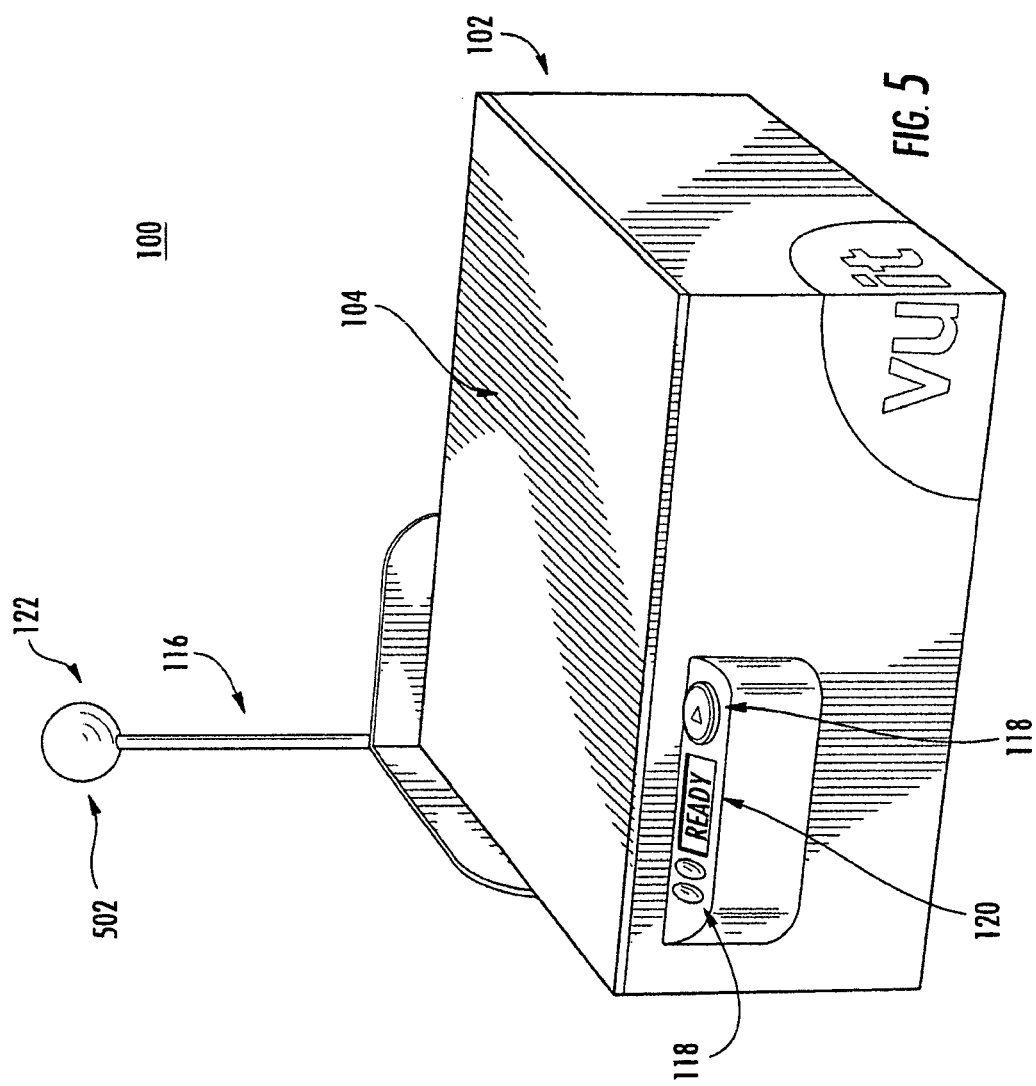
FIGS. 5, 6a and 6b show views of alternate embodiments of an enrollment device.

Although an exemplary embodiment is presented above, it is to be understood that other suitable configurations for the enrollment device may be used. For example, FIG. 5 shows a perspective view of an exemplary embodiment of an enrollment device 100. In this configuration, instruments such as an ultrasonic rangefinder 122 and/or RFID reader are incorporated in a spherical enclosure 502 on top of an extension arm positioned at the corner of the device's main enclosure 102. Control buttons 118 and an organic LED (OLED) display 120 are positioned on the main enclosure 102.

Figure 6A:
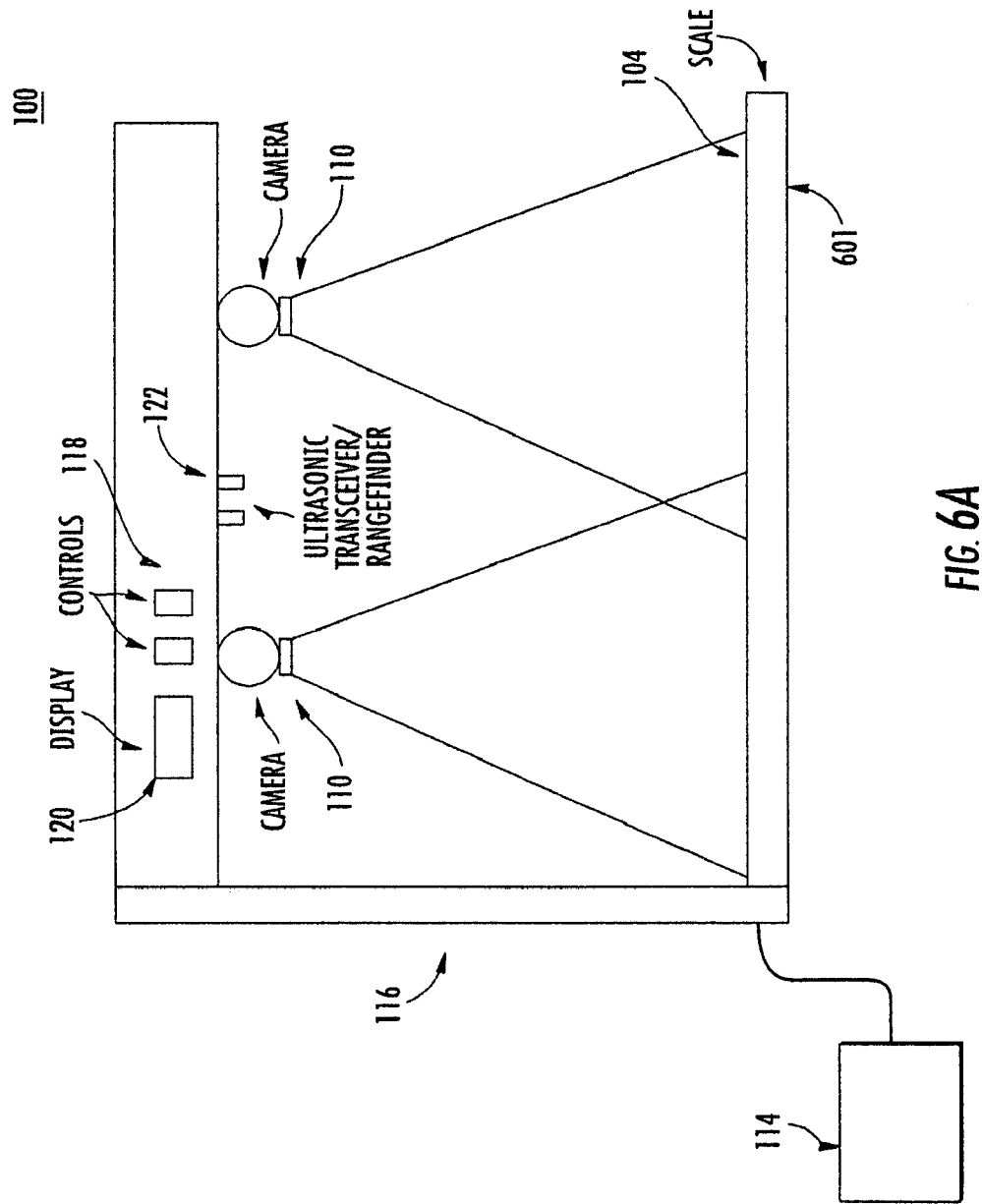

FIG. 6a shows another exemplary embodiment, in which cameras 110 are placed on the extension arm 116 instead of in a main enclosure of the device, thereby providing a top down view of a package placed on the surface 104 of a weight scale 601. In some applications, this configuration may provide additional comfort for users accustomed to placing packages with labels or other printed information "face up", while still allowing for dimension capture, OCR, etc. As shown, processor 114 is located externally, but in other embodiments it may be located integrally.

Figure 6B:
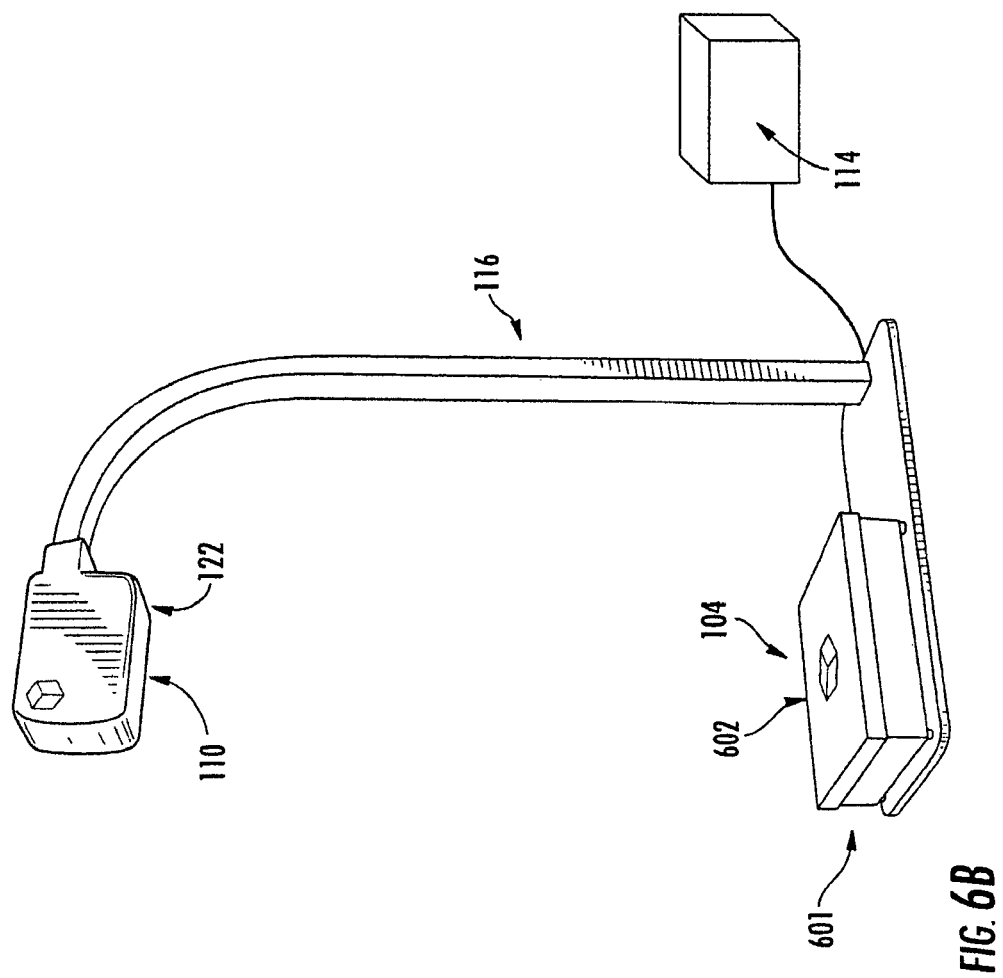

FIG. 6b shows a similar embodiment featuring a single camera 110. Camera 110 may have a field of view larger than and encompassing surface 104, such that even packages which are as large or larger than package receiving surface 104 of weight scale 601 may be imaged. Camera 110 may include an autofocus or other focusing and/or alignment systems. Indicia 602 on surface 104 may be used to aid in focusing and/or alignment of camera 110.

Figure 7:
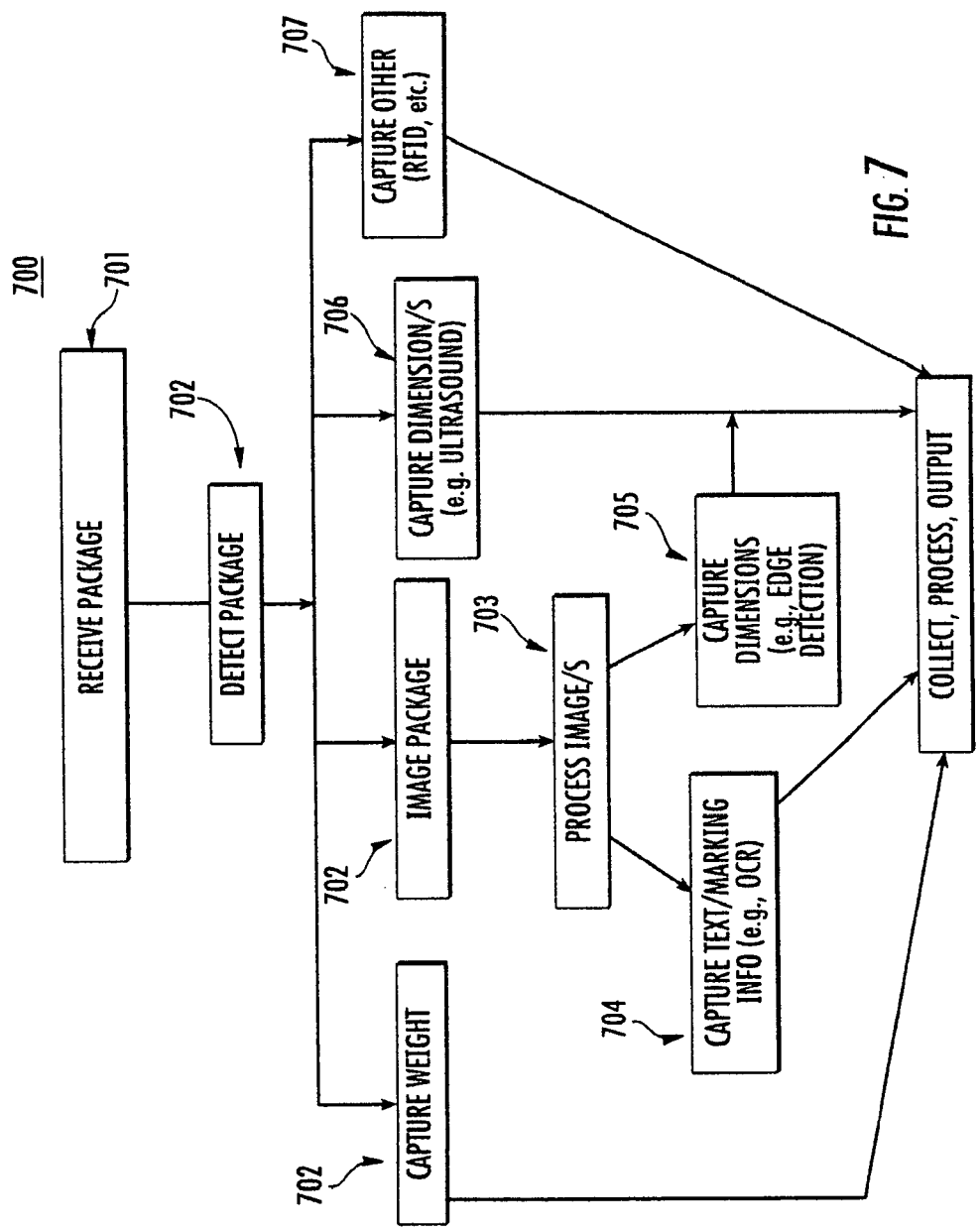
FIG. 7 is a flow diagram illustrating operation of an enrollment device.

FIG. 7 illustrates the flow of an enrollment process 700 using a device 100 of the type described above. Initially, in step 701 the package to be enrolled is received on the receiving surface 104 of the enrollment device 100. In step 702, the presence of the package is detected, for example, as described in greater detail below, by processing a stream of video images captured by the cameras (or camera) 110.

Once the presence of the package is detected, multiple types of information about the package are captured in parallel steps. In step 702, the weight of the object is captured, e.g. by the load cells 198 or scale 601.

In step 702, the cameras 110 capture one or more images of the package. The images undergo a processing step 703 to provide information about the package. For example, in step 705 machine vision applications (e.g. edge detection) may be used to capture one or more dimensions (e.g. length, width) of the package. Optical character recognition techniques can be used in step 704 to capture text or other markings on the package (e.g., postal markings/permits, bar codes, etc.).

In step 706, one or more dimensions of the package are captured. For example, the height of the package may be determined by the ultrasonic range finder 122. This information can be combined with dimension information determined in the image processing step to provide complete dimensional information (e.g. length, width and height) of the package.

In step 707, the enrollment device 100 captures other types of information related to the package. For example, an RFID reader connected to or integrated with the enrollment device can gather information from an RFID tag on the package.

In step 708, the information captured in the above described steps is then collected, processed, and/or stored. The information may also be output, for example to a delivery service business system. The information may be output in any suitable form including electronic data, an analog signal, printed material, visual display, etc.

For example, in some embodiments, information is displayed to a user via a graphical user interface. The user may confirm or edit the captured information, enter additional information, query a customer as to a choice of delivery options or additional services, etc. In some embodiments, printed material (e.g. labels, stamps, etc.) may be output from an attached or integral printer. In some embodiments, output can include markings (e.g. barcodes) printed directly onto the package using, for example, an attached or integral spray printing system, or through attaching separately printed labels with bar code, postage, or related package information—based on information derived from the device.

In some embodiments, the performance of one or more steps might depend on the results of other steps. For example, the imaging and OCR of a package might determine that the package was a "flat rate" envelope of the type common in postal and delivery services. In such a case, weight and dimensional information is not relevant, and thus the steps used to capture this type of information may be omitted.

Figure 8:
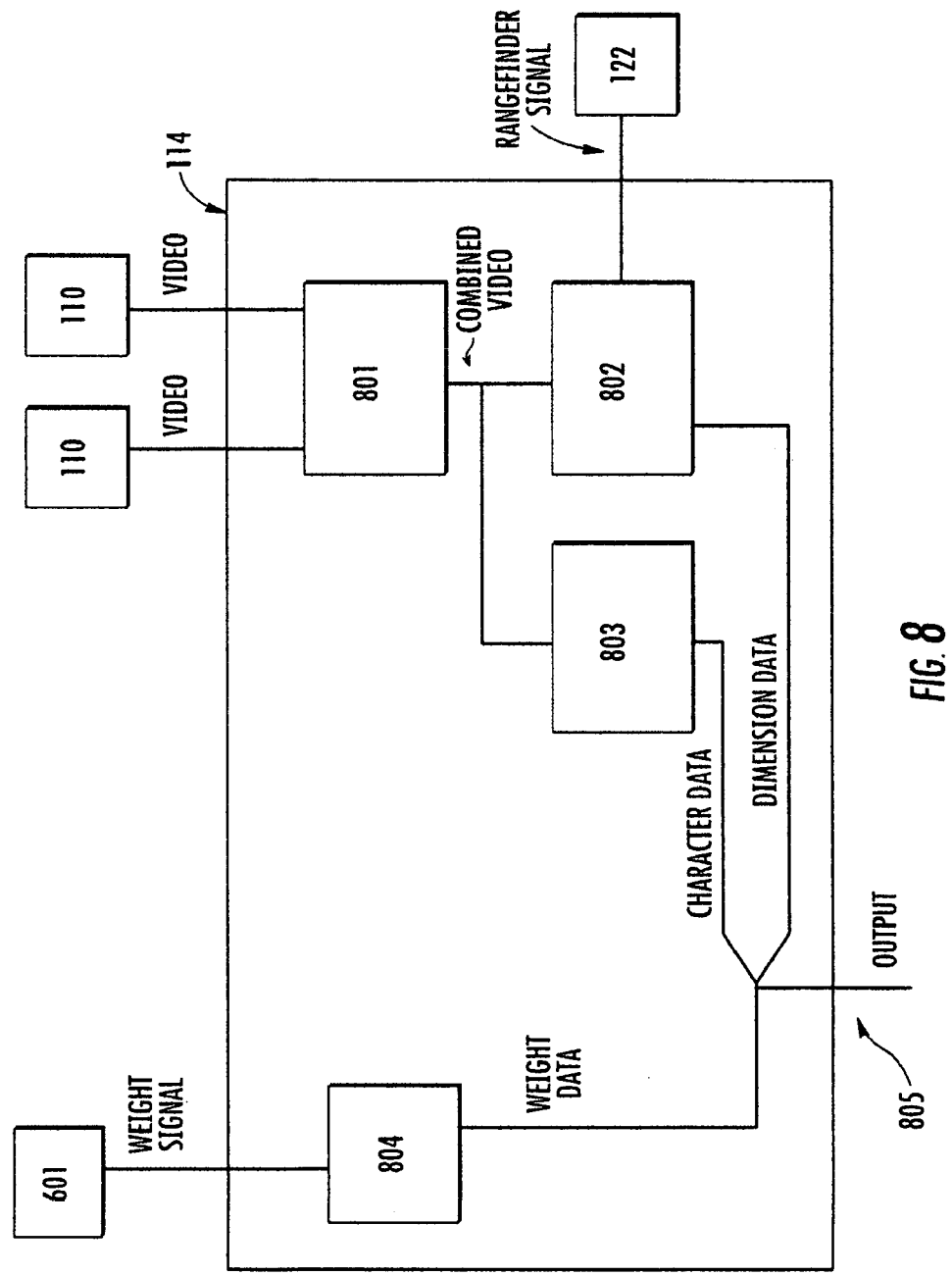
FIG. 8 is a diagram of an exemplary processor.

FIG. 8*a* shows an exemplary embodiment of processor 114. Video signals from cameras 110 are input to frame stitching module 801 which combines multiple overlapping views of surface 104 into a single view (in embodiments featuring a single camera may omit this module). The combined video signal is passed to dimension capture module 802 and recognition module 803. Rangefinder signal may also be passed from rangefinder 122 to dimension capture module 802 and recognition module 803. Using, e.g. the techniques described herein, dimension capture module 802 operates to produce dimension data indicative of the size (e.g. length, width, and/or height) of a package based on the input signals. For example, module 802 may determine the length and width of the object based on edge finding processing of the combined video signal and the height of the package based on the rangefinder signal.

Using, e.g. the techniques described herein, recognition module 804 operates to produce character data related to one or more characters (e.g. alphanumeric address, bar code, postal mark, symbols, etc) found on the package.

Weight module 804 receives a weight signal input from a weight sensor such as load cells 122 or scale 601, and produces weight data indicative of the weight of a package placed on surface 104.

Processor 114 combines the weight, dimension, and character data from modules 802, 803, and 804 and outputs the data from output 805. The operation of the modules described above will be further described below.

Figure 9:
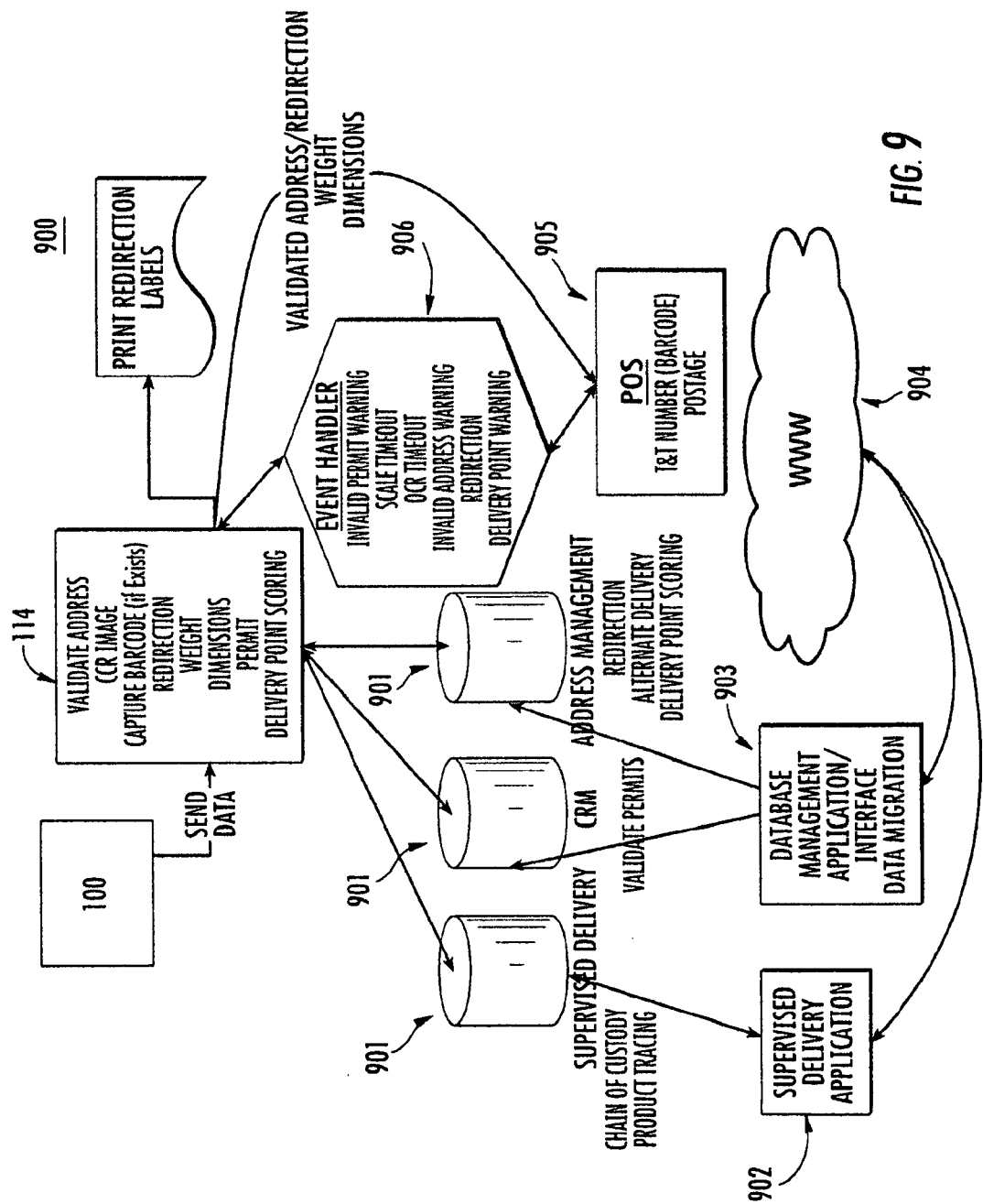
FIG. 9 is an illustration of a system featuring an enrollment device.

FIG. 9 illustrates the integration of an enrollment device 100 into an exemplary delivery system 900. As described above, an enrollment device 100 (captures numerous pieces of information which are passed on to and processed by processor 114 (e.g. via firmware run by a compact PC integrated with or linked to device 100). Processor 114 may communicate (e.g. using a network connection), with one or more servers 901. For example, an address management server could exchange information related to redirection or alternate delivery. A rights management server could exchange information to validate permits or confirm postage. A supervised delivery server could exchange information related to package tracking or chain of custody (e.g. for prescription medications or legal evidence). In some embodiments, these servers might further interact with other "back end" applications including supervised delivery application 902 and database management applications 903. Such applications could be connected via a network 904 (e.g., an intranet, extranet, the world wide web, etc.)

Processor 114 interacts with a point of service (POS) system 905 (e.g. a postal service counter sales system) to provide, for example, validated address or redirection information, weight, dimensions, etc. Interactions might be mediated by an event handler application 906 which interrupts or otherwise communicates with the POS system to provide, for example, invalid permit, address, or delivery point warnings, redirection information, scale/OCR timeout indications, etc.

Enrollment Functions

The following describes more detailed examples of the various functions which may be carried out by enrollment device 100.

Scale Function

In some embodiments, the enrollment device 100 includes a scale 601 for acquiring information about the weight of a package. For example, in various embodiments, a solid state weighing device (e.g. including one or more load cells 118) operates with accuracies consistent with relevant standards (e.g. US Postal Service and/or Royal Mail requirements). Direct management of a display device may be provided in support of weights and measure requirement.

In some embodiments, detailed usage history is kept in order to ensure accurate performance throughout the life of the scale. Remote supervision may be provided (e.g. via an internet connection provided through an integrated compact PC). Suspect scales can be identified via an analytics application.

Imaging Function

In typical applications, the enrollment device 100 detects the presence of a package and captures an image of at least a portion of the package. The image is processed to derive information from the package (e.g. from mailing labels or printed markings) including: printed address/destination info, sending identification information, postal markings, and other information such as proprietary barcode information. In various embodiments the enrollment device acquires this information in an automated fashion, performed in such a way as to have reduced negative impact on currently sorting.

Figure 10:
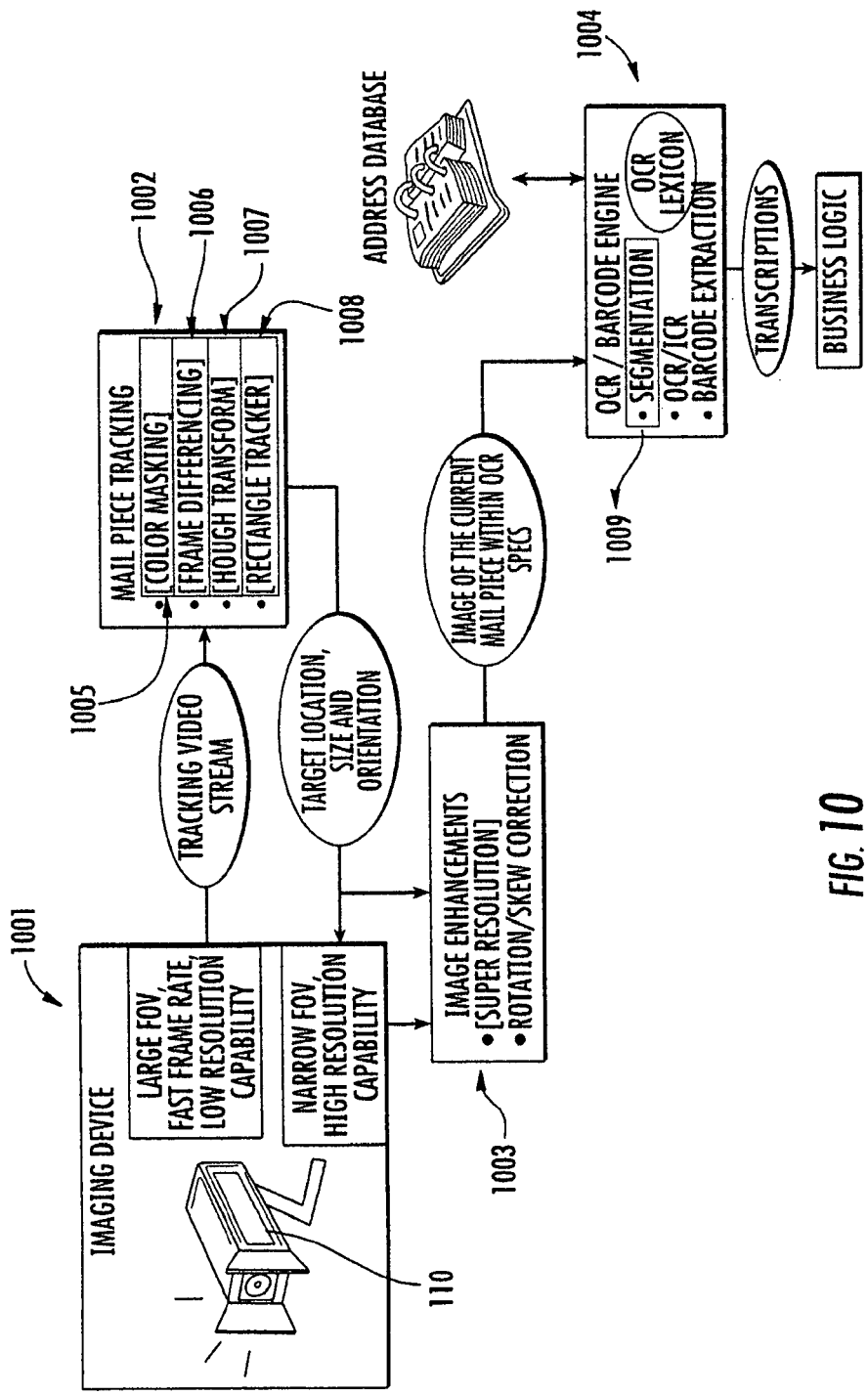
FIG. 10 illustrates modules included in an enrollment device.

Referring to FIG. 10, in some embodiments, the image related tasks of the enrollment device are performed by four modules: the imaging device module 1001, the tracking module, the image enhancement and dimension capture module 1003 and the recognition module 1004. All or portions of the above modules may be included in processor 114.

The imaging device module 1001 employs one or more cameras 110 to obtain images of a package. The imaging device module 1001 may operate to meet two different sets of requirements imposed by the tracking module 1002 and the recognition module 1004. As will be described below, mail piece tracking module 1002 typically requires image capture with a relatively large field of view and a relatively high frame rate, but can tolerate relatively low resolution. The recognition module 1004, on the other hand, requires relatively high resolution images (e.g. about 200 dots per inch, "dpi"), but can typically tolerate a relatively narrow field of view and relatively slower frame rate. Accordingly, in some embodiments, the imaging device module 1001 operates in a first mode to provide a low resolution but large field of view (e.g. substantially covering the surface 104 of a device 100) and high frame rate image stream to the tracking module 1002. When a package is placed on receiving surface 104 of the enrollment device 100, the tracking module identifies the package's presence, location (i.e. position and/or orientation), and size. The imaging module 1001, using information from the tracking module 1002, then switches to a high resolution mode to capture high quality images of areas of interest (e.g. an area including an address label) on the package.

Note that in various embodiments these modules may be implemented in hardware (e.g. using multiple cameras or sensors of varying resolution) or in software (e.g. using image processing techniques known in the art) or in a combination thereof.

As mentioned above, the tracking module 1002 operates to monitor a stream of image information from the imaging device module 1001 to detect the presence of and determine the size and location/orientation of a package placed on receiving surface 104 of the enrollment device 100. Several tracking techniques will be described herein, however, it is to be understood that the tracking function may be performed by any suitable techniques (e.g. using known machine vision applications).

In some embodiments, the tracking module 1002 employs a color masking module 1005. Color masking is a technique used when looking for an object which leverages unique color information that the object might have (e.g., brow coloring for parcels) and/or that the background may have (e.g. the known color of surface 104). In typical applications, the color masking process consists of removing any pixel of an image that deviates to a specific range of color values.

For this type of approach, the well known RGB color space is sometimes not the most appropriate if one wants to avoid artifacts due to lighting inconsistencies. Instead, computing color deviations in the YUV or the YCbCr color spaces typically leads to better results. For reference, Y is usually referred to a luminance and turning an RGB color value in the YCbCr color space can be done through these simple relationships:

$$Y=0.31\ R+0.59\ G+0.11\ B; Cr=R-Y; Cb=B-Y$$

The advantage of this color representation is that lighting inconsistencies will typically incur radial shifts of the (Cb, Cr) value around the center of this plane. Hence the angle of a polar representation of this color plane can be fairly invariant through lighting changes. It is also noteworthy to notice that this angle is closely related to the concept of a color's hue.

In some embodiments, the tracking module 1002 employs motion analysis using, for example, frame differencing module 1006. For example, one way to detect motion is through a frame differencing process. As the system (e.g. featuring a stationary camera) gathers successive video frames it simply compares each pixel value to its value in the previous frames and removes those that have not changed significantly. When the images are provided as grayscale, intensity is the only available parameter but in the case of color images there are alternative ways to perform these differences depending on the color space.

Such a frame differencing process is effectively a temporal high-pass filter and as such it is highly prone to pixel noise. Therefore it is often coupled with subsequent image processing stages such as linear or morphologic filters, which are discussed below.

Figure 11:
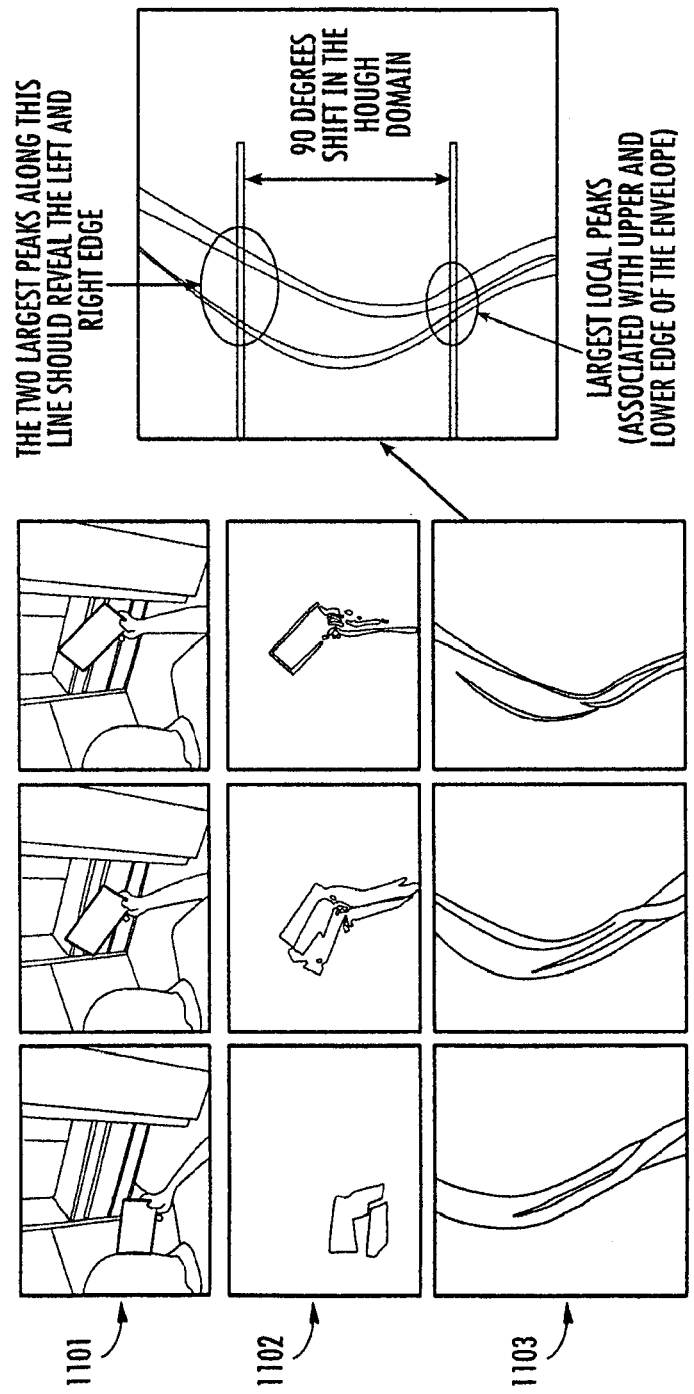
FIG. 11 illustrates image processing by an enrollment device.

FIG. 11 shows an example of frame difference tracking. A short series of video frames 1101 were captured of an envelope being handled in a "visually busy" environment. These frames were further imported within the Matlab environment where the differences between successive frames were computed. These difference images 1102, illustrated in the second row of FIG. 10*b*, reveal the mail piece. However, the frame differencing also reveals any other moving object, such as the person's hand and arm.

Figure 12:
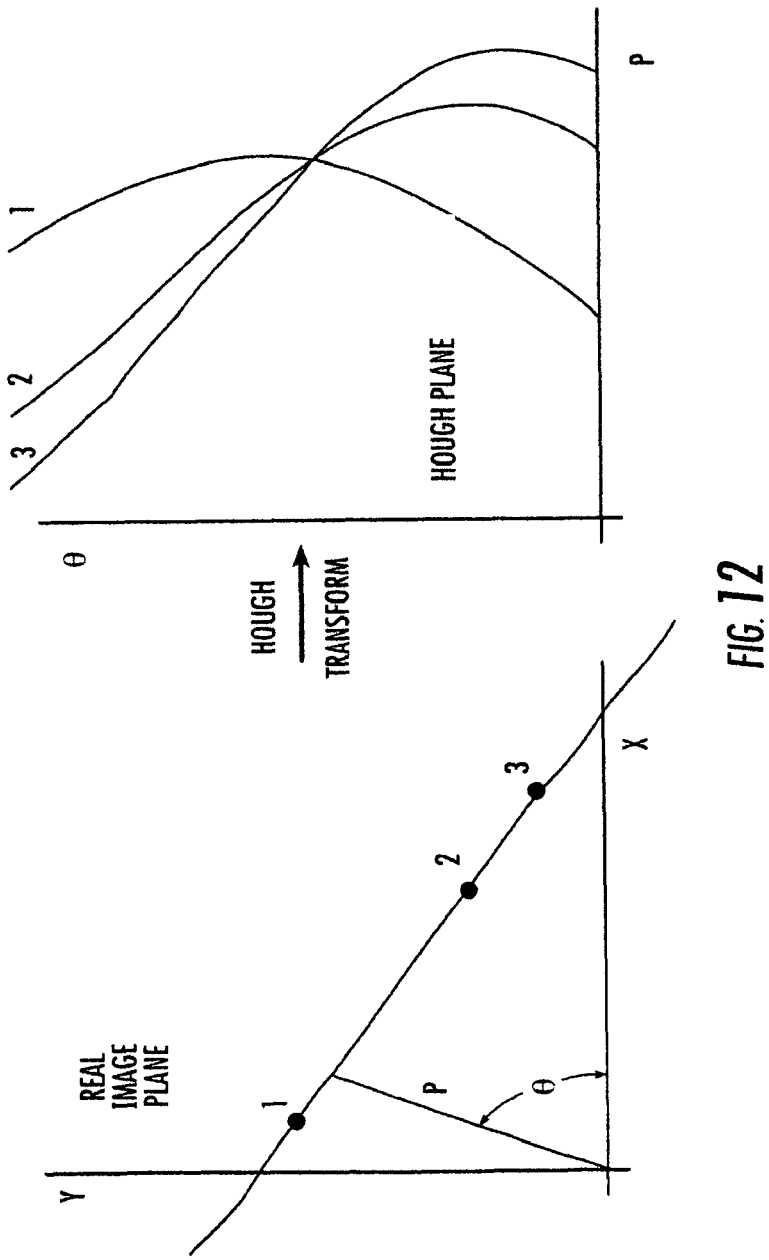
FIG. 12 illustrates a Hough transform.

In order to identify a rectangular object (e.g. a package or envelope) in the frame differences, in some embodiments, the tracking module 1002 employs the Hough transform module 1007 to transform the frame differenced data 1102 to produce Hough domain images 1103. The primary purpose of this transform is to extract linear graphic elements (i.e. straight lines) from an image. It effectively does so by maintaining a series of accumulators that keep track of all lines that pass through a set of points. As many of these points are collinear, the largest of these accumulators reveal the equation of that line in the Hough domain. In that domain, the y-axis corresponds to the orientation of that line and the x-axis corresponds to the distance between that line and an origin one chooses in the image. This mapping is shown in FIG. 12. For example, FIG. 12 shows three points in the spatial domain. For each one of these points, all the lines that pass through it are represented by a "vertical sinusoid" in the Hough domain. Because these three points where chosen to be collinear, notice that the three corresponding sinusoids intersect. The coordinates (θ, ρ) of this intersection describe the line that passes through all three points uniquely.

Referring back to FIG. 11, the third row of Hough domain images 1103 shows the Hough domain that corresponds to each frame difference 1102. As the motion of the mail piece slows down (i.e. third column in the FIG. 11) and the difference frame starts to show a clear rectangular outline of the mail piece.

Note, as shown in the inset of FIG. 11, that the Hough domain sharpens up, revealing two noticeable peaks lined up horizontally. The fact that these peaks live on the same horizon in the Hough domain reveals that these two corresponding lines are parallel: one has thus found the upper and lower edges of the mail piece.

If one were to further look for linear feature that are perpendicular to these edges one would simply look for local maximums in the Hough domain at the horizon corresponding to a 90 degrees rotation. In the case of the current example this would further reveal an estimation of the left and right edges of the mail piece.

Rectangle tracking module 1008 can leverage information of the type described above to track the location/orientation of rectangular packages. Frame differencing and a Hough transform provide a solid basis for the tracking of a moving rectangular object. It has the great benefits of further providing orientation estimation for the mail piece in the same process, while requiring no further assumption concerning the size or even the aspect ratio of the rectangular object.

In typical applications, color masking and motion analysis can reveal "blobs" (connected regions) of pixels that maybe of interest. In some cases this might be not enough to locate the target or an area of interest. As previously noted, shape-related image analysis techniques such as the Hough transformation can provide additional information. Some techniques useful for tracking include, for example blob segmentation clustering. One useful step is to group pixels that may belong to the same spatial blob. These techniques are discussed further in the context of image enhancement and OCR below.

One way to quantify a blob of pixels is by measuring its spatial moments. The first order moment is simply the blob's center of mass. Its second order moments provide measures about how "spread" the blob is around its center of mass. Through a simple diagonalization process these second order moments can further lead to the blob's principal components, which provide a general measure of the object's aspect ratio and its orientation. In a 1962 publication, Ming-Kuei Hu suggested a means to normalize and combine the second and third central moments of a graphical object, leading to a set of 7 descriptors that have since been referred to as the Hu-moments. These 7 features have the highly desirable properties of being translation, rotation and scale invariant. A number of OCR engines have subsequently been developed based on these features.

Extracting the edges of a visual object is also a very common step that may come handy as one searches for a target mail piece. One of the most popular methods is the Canny edge detection algorithm. It is equivalent to the location of local maximums in the output of a high frequency (gradient) filter. The method actually starts with the application of a low-pass filter in order to reduce noise in the image so the whole process can be seen as some band-pass filtering stage followed by a morphologic processing stage.

Once a package presence has been detected and location, orientation, and size determined by the tracking module 1002, one or more images of the package at a desired resolution are obtained by the imaging device module and passed on to the image enhancement module 1003. In various embodiments, this module operates to process these images to compensate for the amount of rotation from ideal registration (i.e. registration with the edges of the surface 104 of the enrollment device 100) that was detected by the mail piece tracking module. As is known in the art, this can be achieved through, for example, a resampling stage. In typical applications, this resampling stage does not require any more than a bilinear interpolation between pixels.

As required by the application or environment at hand, some embodiments employ other image enhancement processing techniques to provide a high quality image to the recognition module 1004 for, for example, accurate OCR.

Depending on the OCR performance achieved, a further segmentation module 1009 may be added to the image enhancements module. The typical image analysis technique will make a certain number of assumptions concerning the input image. Some of these assumptions might be reasonable in the context of the application and some others might require a little bit of work on the input. This is where preprocessing typically comes into play. As a general rule, the object of a preprocessing stage is to emphasize or reveal salient features of an image while damping irrelevant or undesirable ones before attempting to perform further analysis of the image's content. There are numerous types of processing known in the art that may share such an objective. Some such processing types are composed of elementary stages that fall within one of the following major categories: color manipulations, linear filters, morphological image processing, or image segmentation.

Color manipulations include grayscale conversion from a color image, color depth reduction, thresholding (to a binary image for instance), brightness and contrast modifications, color clipping, negation and many others. In such processes, the color value of an output pixel is a direct function of the input color value of that same pixel and some global parameters. In some cases, these global parameters might be derived from an overall analysis of the input image but once chosen they remain the same during the processing of all pixels in the image.

Linear image filters can typically be seen as a convolution between the input image and another (usually smaller) image that's sometime referred to as a kernel. Their objective is to reveal certain spatial frequency components of the image while damping others. The most commonly used linear filters are either blurring (low-pass) or sharpening (high-pass) the image. Gradients and differentiators used for edge detection are another commonly used type of high-pass linear filters. Performing a brute force 2D convolution can be a computationally expensive proposition. Indeed if the filter kernel M is a square image counting N rows and N columns, processing a single input pixel through the kernel will require $N^2$ operations. One way to overcome this prohibitive scaling is to use what are sometimes referred to as separable filters. Those are filters for which the kernel M is an outer-product of two vectors: i.e. $M=UV^T$, where U and V are vectors of length N.

With such a choice for the filter, the sliding correlation with the matrix M over the entire image can be expressed as the cascade of two 1D filtering stages over the two dimensions (horizontal and vertical) of the image. The elements of the vector V are the impulse response of the 1D filtering stage we first apply to each row and the elements of the vector U are the impulse response of the 1D filtering stage we subsequently apply to each column. Each 1D filtering stage involves N operations per pixel and therefore, the entire sliding correlation with the matrix M involves only 2N operations (as opposed to $N^2$ if the filter were not separable).

The most common separable filters are Gaussian low-pass filters. The separability of their kernel falls out from the fact that the product of two Gaussians is also a Gaussian. Note that the same technique can be applied for separable kernels that are not square (i.e. the vectors U and V have different lengths). In cases where the kernel in not separable, one may use techniques known in the art to approximate the kernel as a combination of separable filtering stages. These techniques will typically perform an eigenvalue decomposition of the kernel.

Other noteworthy special cases of separable linear filters are filters for which the kernel matrix is filled with the same value. These are effectively low pass filters that average all pixel values over a rectangular neighborhood centered on the pixel position. Although they might exhibit less than ideal frequency responses they have the great advantage of being computationally cheap. Indeed regardless of the kernel size, their computation consists of simple running sums performed subsequently over the horizontal and vertical direction of the image, requiring a total of only 4 operations per pixel.

Morphological image processing is a type of processing in which the spatial form or structure of objects within an image are modified. Dilation (objects grow uniformly), erosion (objects shrink uniformly) and skeletonization (objects are reduced to "stick figures") are three fundamental morphological operations. Typically, these operations are performed over binary images for which there is a clear concept of presence and absence of an object at every pixel position but these concepts have also been extended to grayscale images.

Binary image morphological operations are based on the concept of connectivity between pixels of the same class. From an implementation point of view, these operations typically consist of a few iterations through a set of hit or miss transformations. A hit or miss transformation is effectively a binary pattern lookup table. While a linear filter would apply a fixed linear combination of the input in order to set the output value of a pixel, this process will set a pixel to either 1 or 0 depending on whether its surrounding pattern is found in the table or not (Hence the terms "hit or miss"). Depending on the lookup table, this can effectively implement a highly non-linear operation.

Image segmentation includes the division of an image into regions (or blobs) of similar attributes. As discussed below, an OCR system will typically include at least one image segmentation stage. In fact, many suitable image analysis algorithms aiming to localize, identify or recognize graphical elements perform some form of image segmentation.

In general terms this process may consists of a clustering or classification of pixel positions based on a local graphical measure. This graphical measure is the image attribute that should be fairly uniform over a region. In other words, the resulting regions or blobs should be homogeneous with respect to some local image characteristic. This local measure may simply consist of the pixel's color but some applications may require more sophisticated measures of the image's local texture around that pixel position. It is also generally understood that a segmentation process should aim to reveal regions or blobs that exhibit rather simple interiors without too many small holes.

The nature of the chosen graphical attribute depends entirely on the application and the type of blobs one is trying to isolate. For example, segmenting an image into text versus non-text regions will require some sort of texture attribute while segmenting light versus dark areas will only require color intensity as an attribute.

Once the chosen attribute has been computed throughout the image, the remainder of the segmentation process will typically use an ad-hoc algorithm. One of the most intuitive techniques is sometimes referred to a region growing and its recursive nature is very similar in spirit to a floodfill algorithm. More sophisticated techniques implement clustering processes using classical iterative algorithms known in the art such as k-means or ISODATA.

In some applications, it may be necessary to increase the resolution of the captured image or images. In some embodiments, resolution of the image may be increased using a technique know as superresolution. The Nyquist sampling criterion requires that the sampling frequency should be at least double for the highest frequency of the signal or image features one wishes to resolve. For a given image module 1001 focal length, this typically implies that the smallest optical feature one can resolve will never be smaller then 2 pixels-worth of a pixilated sensor's (e.g. CCD's) resolution.

A common practice to overcome this theoretical limit is to combine multiple captures of the same object from slightly different perspectives. While each capture suffers from Nyquist's limit they form, together, a non-uniform but higher frequency sampling of the object. The key to this process is the ability to align these multiple captures with sub-sample accuracy. Once the individual captures are up-sampled and aligned, they can carefully averaged based on their sampling phase. This process effectively re-constructs a capture of the object with higher sampling frequency, and hence a higher image resolution. Variations of such techniques are known from, for example, the field of image processing.

Once an image has been processed by the image enhancement module 1003, it is passed on to the recognition module 1004. The recognition module operates to derive information from, for example, labels or printed markings on the object using e.g., OCR. While it is to be understood that any suitable OCR technique or tool may be used, in the following several exemplary OCR techniques will be described.

Various embodiments provide the ability to isolate text within a provided image and to turn it reliably into text, e.g., ASCII codes. A goal of OCR is to recognize machine printed text using, e.g., a single font of a single size or even multi-font text having a range of character sizes.

Some OCR techniques exploit the regularity of spatial patterns. Techniques like template matching use the shape of single-font characters to locate them in textual images. Other techniques do not rely solely on the spatial patterns but instead characterize the structure of characters based on the strokes used to generate them. Despite the considerable variety in the techniques employed, many suitable OCR systems share a similar set of processing stages.

One OCR stage may include extraction of the character regions from an image: This stage will typically use ancillary information known in order to select image properties that are sufficiently different for the text regions and the background regions as the basis for distinguishing one from the other. One common technique when the background is a known solid color (white for instance) is to apply iterative dichotomies based on color histograms. Other techniques might make use of known character sizes or other spatial arrangements.

Another OCR stage may include segmentation of the image into text and background. Once provided with image regions that contain text the goal of this stage is to identify image pixels that belong to text and those that belong to the background. The most common technique used here is a threshold applied to the grayscale image. The threshold value may be fixed using ancillary knowledge about the application or by using measures calculated in the neighborhood of each pixel to determine an adaptive local threshold.

Another OCR stage may include conditioning of the image: The image segments resulting from segmentation may contain some pixels identified as belonging to the wrong group. This stage consists of a variety of techniques used to clean it up and delete noise.

Yet anther OCR stage may include segmentation of characters: Some techniques will subsequently segment the input image into regions that contain individual characters but other algorithms will avoid this stage and proceed with character recognition without prior character segmentation. This latter technique is driven by the realization that in many cases character segmentation turns out to be a more difficult problem than recognition itself.

Some OCR stages include normalization of character size: Once the image is segmented into characters, one may adjust the size of the character regions so that the following stages can assume a standard character size. Systems that rely on size-independent topological features for their character recognition stages might not require such normalization.

OCR systems typically include feature detection: Many different feature detection techniques are known in the art. Some template matching is used to find the whole character as a feature, while other systems seek sub features of the characters. These may include boundary outlines, the character skeleton or medial axis, the Fourier or Wavelet coefficients of the spatial pattern, various spatial moments and topological properties such as the number of holes in a pattern.

A classification stage may be used to assign, to a character region, the character whose properties best match the properties stored in the feature vector of the region. Some systems use structural classifiers consisting of a set of tests and heuristics based on the designer's understanding of character formation. Other classifiers take a statistical rather than structural approach, relying on a set of training samples and using statistical techniques to build a classifier. These approaches include the Bayes decision rule, nearest neighbor lookups, decision trees, and neural networks.

In a verification stage knowledge about the expected result is used to check if the recognized text is consistent with the expected text. Such verification may include confirming that the extracted words are found in a dictionary, or otherwise match some external source of information (e.g. if city information and zip code information in a U.S. postal address match). This stage is obviously application dependent.

In various embodiments, the recognition module 1004 may employ any of the above described techniques, alone or in combination.

Recognition of handwritten characters (sometimes referred to as ICR) may, in some applications, be more challenging. In the context of applications such as tablet computers or PDA, the ICR engine will often take advantage of pen stroke dynamics. Of course this type of information is not available from the optical capture of a hand-written document. Such applications may require the system to be restricted to a smaller number of permissible characters (e.g. upper caps or numeral) and/or rely heavily on a small lexicon For example, when text is handwritten in cursive it is often difficult to segment each letter separately so rather than operating as an optical character recognition, an ICR system will often operate as a "Word recognizer", looking to the best match between the graphical object and a small lexicon of recognizable words, In order to achieve a satisfactory recognition rate, this lexicon might need to be as small as 10 words or so.

In various embodiments, the performance of an OCR system may be increased by specializing to the task at hand by restricting its lexicon or dictionary so that it can effectively recover from few character recognition errors the same way a computer (e.g. running a word processor) might be able to correct a typo.

Maintaining a restricted and dynamic lexicon is more effective when a document has a rigid and known structure. Without such structure it might not be possible to use a lexicon any smaller than a dictionary for the language at hand.

Figure 13:
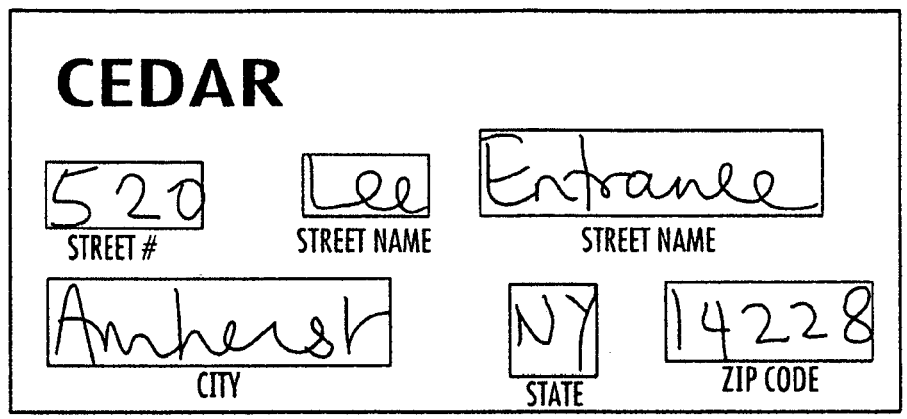
FIG. 13 illustrates segmented address information.

Fortunately, as shown in FIG. 13 an address appearing on a mail piece is typically a relatively highly structured a document. This is why the USPS can OCR a large part of the machinable mail pieces even when address are hand-written.

In typical embodiments, a proper usage of OCR should take into account some typical shortcomings. Generality must be considered versus accuracy. A single classifier might be trained to get improved results in limited circumstances (a single font for instance) but its performance will typically drop when the size of its training set increases. Consequently, modern classifiers are in fact conglomerates of classifiers coupled with a mechanism to consolidate their results, This in turn will tend to further increase the already substantial computational requirements of the system if it is intended to cope with a large variety of fonts.

Non uniform backgrounds may present challenges. OCR algorithms typically take advantage of the fact that the text is presented on a uniform background that has sufficiently high contrast between text and background colors, en the background is not uniform, OCR recognition rates are substantially decreased. In those cases and in order to remove a non-uniform background from the image, additional preprocessing stages might be required prior to the various ones we've presented above.

Image resolution should be considered. OCR technologies were developed within the context of scanned physical documents. Although optical scanning might lead to various artifacts such as noise and slight skewing, these will also typically operate at higher image resolutions (<200 dpi). As discussed above, imaging module 1001 may provide images at such resolutions, e.g. by employing digital cameras known in the art.

Most mail pieces will already convey some machine-readable data (e.g. bar codes, postal marks) by the time it reaches an enrollment device. In various embodiments, the enrollment device may read these markings using OCR, or using additional sensors (e.g. a barcode reader).

FIG. 4d shows the output display of an exemplary embodiment of an enrollment device 100. The display shows the captured image of a package placed on the device, along with information acquired from labels and markings on the package using the OCR techniques described above. This embodiment was able to accommodate OCR of packages placed at an arbitrary angle on receiving surface 104, using, for example, the rotation correction techniques described above.

Information obtained using OCR is passed on for, for example, address quality, meter enforcement, value added service subsystems, and operator input. In some embodiments, the OCR facility will be able to read documents such as passports, driver licenses, credit cards, coupons, tickets, etc. Simply placing the document anywhere on the receiving surface 104 will trigger a read and document analysis. Form capture is also supported with the ability to allow customers to, for example, present completed forms for immediate OCR results available to the postal clerk. Certain forms such as customs declarations can be handled much more efficiently with this facility.

Dimension Capture Function

In typical applications, accurately determining the dimensions of a package at enrollment may be crucial for determining, for example, the rate of postage. For example, postal rates may depend on an objects length, width, height, and/or combinations thereof.

As noted above, during image acquisition and processing, one or more dimensions of a package placed on an enrollment device may be determined. For example, FIG. 4e shows an output display of an exemplary embodiment of an enrollment device 100. The display shows the captured image 401 of a package, a difference image 402, and a Hough plane image 403 generated using the techniques described above. As indicated in the captured image 401, the system has successfully identified the edges of the face of the object imaged by the device. This allows the device to calculate and output the length and width of the package.

The height dimension is captured using, for example, ultrasonic range finder 122, thereby providing complete dimensional information. An ultrasonic transducer emits sound waves and receives sound waves reflected by objects in its environment. The received signals are processed to provide information about the spatial location of the objects. For example, in the embodiment shown in FIGS. 1*a*-1*e*, the rangefinder can determine the vertical position of the top surface of the package 106 relative to the receiving surface 104. One advantage of ultrasonic rangefinder over optical rangefinders is that it is able to unambiguously detect optically transparent surfaces (e.g. the glass surface 104 of FIGS. 1*a*-1*c*).

It is to be understood that, in various embodiments, other suitable dimension capture techniques may be used. Some embodiments may employ other types of rangefinders (e.g. optical sensors). In some embodiments, the top (or other) surface of a package may be located mechanically by bringing a sliding arm or a user held wand in contact with the surface package, and detecting the position of the arm or wand. In some embodiments, more than two dimensions of the package may be determined based on captured image data, for example, by stereoscopically imaging the object from multiple perspectives.

Although the examples above generally include dimension capture of rectangular objects, it is to be understood that the techniques described above can be extended to objects of any arbitrary shape.

RFID Function

If an item has an RFID tag it will be detected and read by an RFID peripheral attached to or integrated with the enrollment device 100. The acquired data is then available for further processing and/or output to downstream applications.

Processing and User Interface Functions

Figure 14:
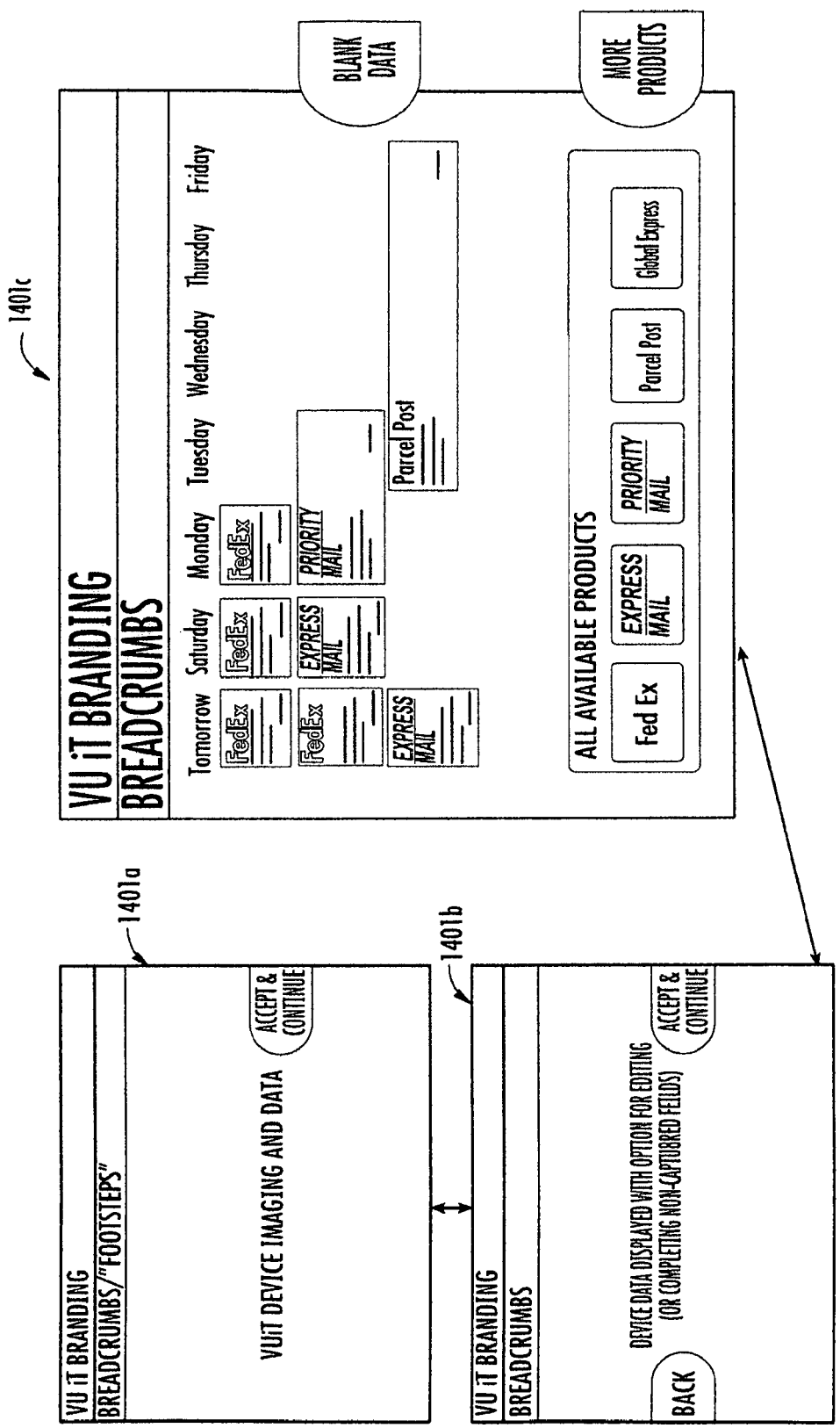
FIGS. 14, 14a-14b, 15a-15c, and 16 illustrate graphical user interface screens for an enrollment device.
Figure 14A:
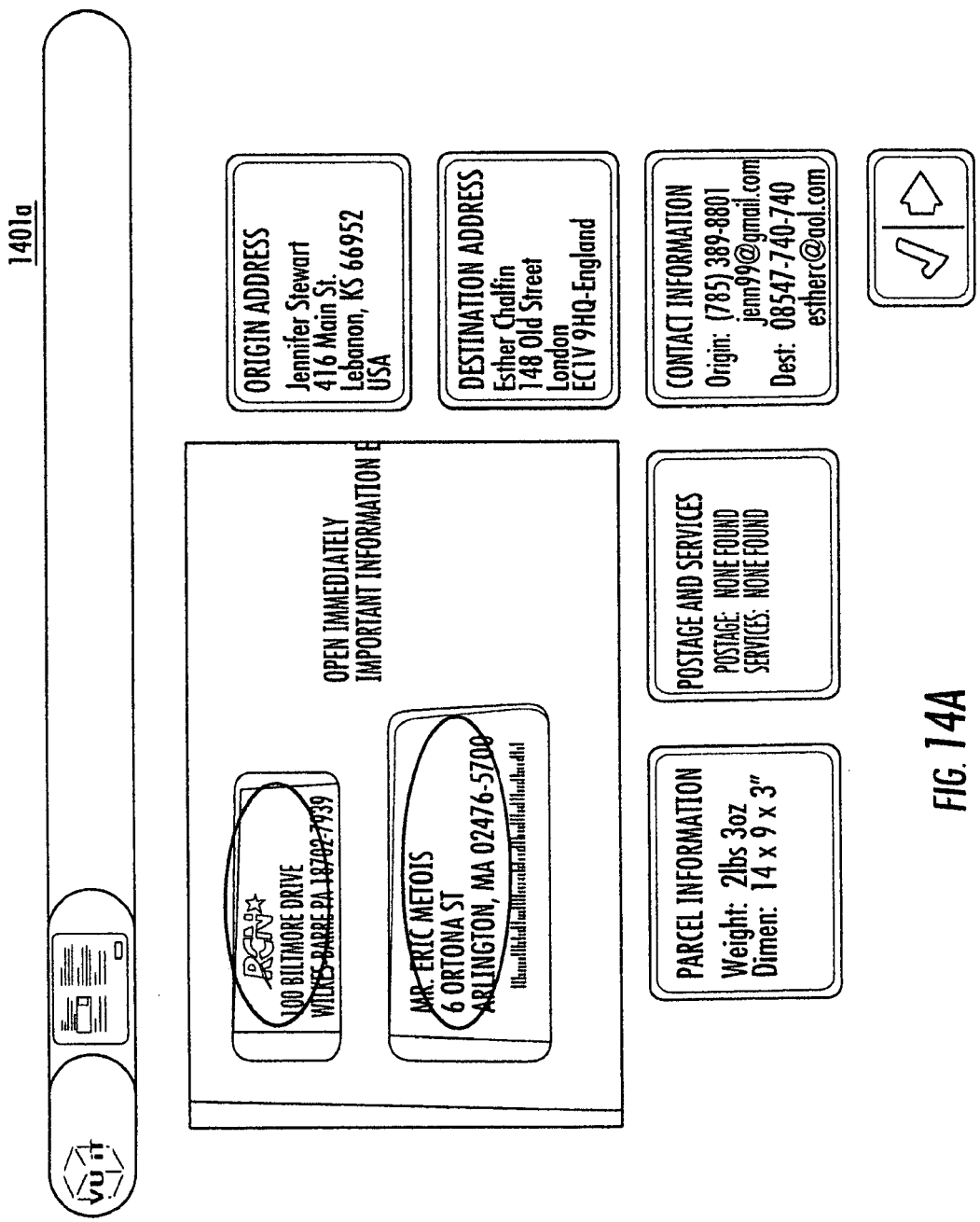
Figure 14B:
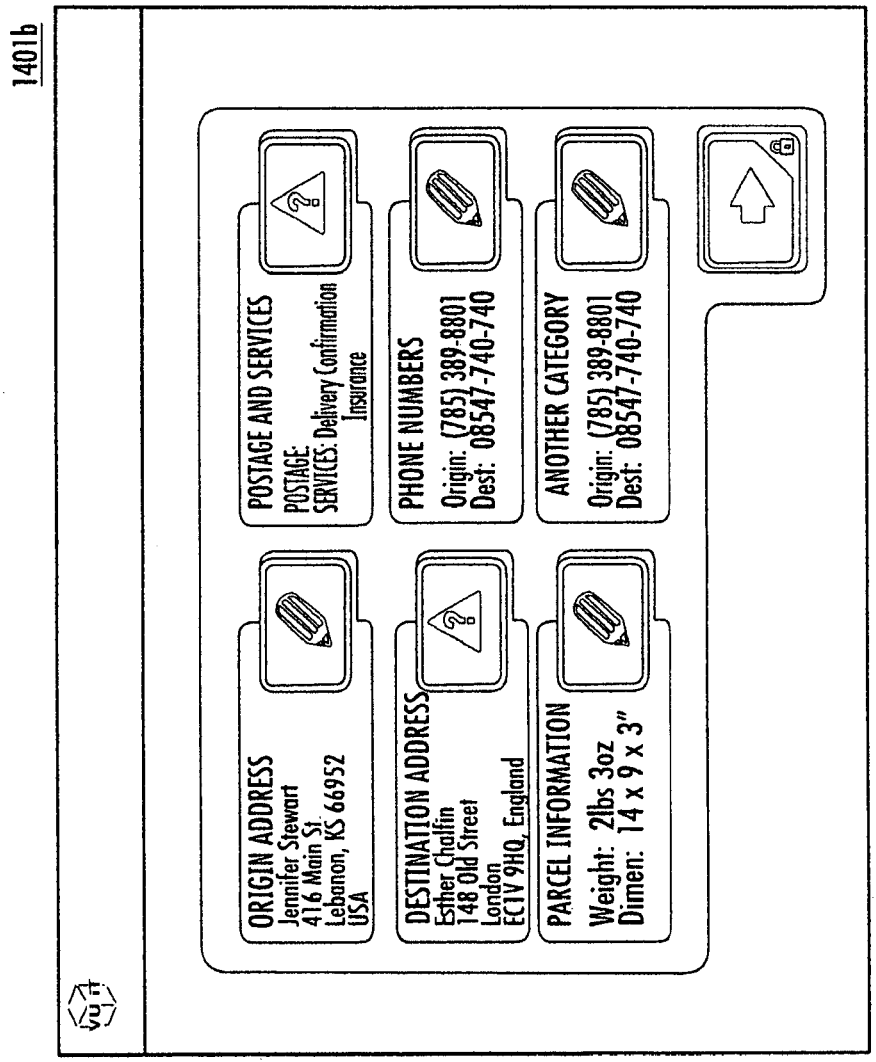

As discussed above, the enrollment device may process the myriad of captured data related to a package and output relevant information to a user. In some embodiments, information is displayed to a user through an interactive graphical user interface (GUI). For example, as shown in FIG. 14, the user may navigate back and forth through a series of screens 1401*a*, 1401*b*, and 1401*c* using, for example, a mouse, keyboard, or touch screen device. Referring to FIG. 14*a*, screen 1401*a* shows an image of the package along with captured data. The user may confirm the captured information and/or choose to proceed to screen 1401*b*, shown in detail in FIG. 14*b*, for editing the captured data and/or adding additional data. Once all relevant information about the package has been captured and confirmed or otherwise entered, a further screen 1401*c* presents various delivery service options.

In some embodiments an expert system employing "backward chaining" logic may be employed to receive and analyze the wealth of information coming from the enrolment device. As is known in the art, in typical applications, backward chaining starts with a list of goals (or a hypothesis) and works backwards from the consequent to the antecedent to see if there is data available that will support any of these consequents. An inference engine using backward chaining would search the inference rules until it finds one which has a consequent (Then clause) that matches a desired goal. If the antecedent (If clause) of that rule is not known to be true, then it is added to the list of goals (in order for your goal to be confirmed you must also provide data that confirms this new rule).

Figure 15A:
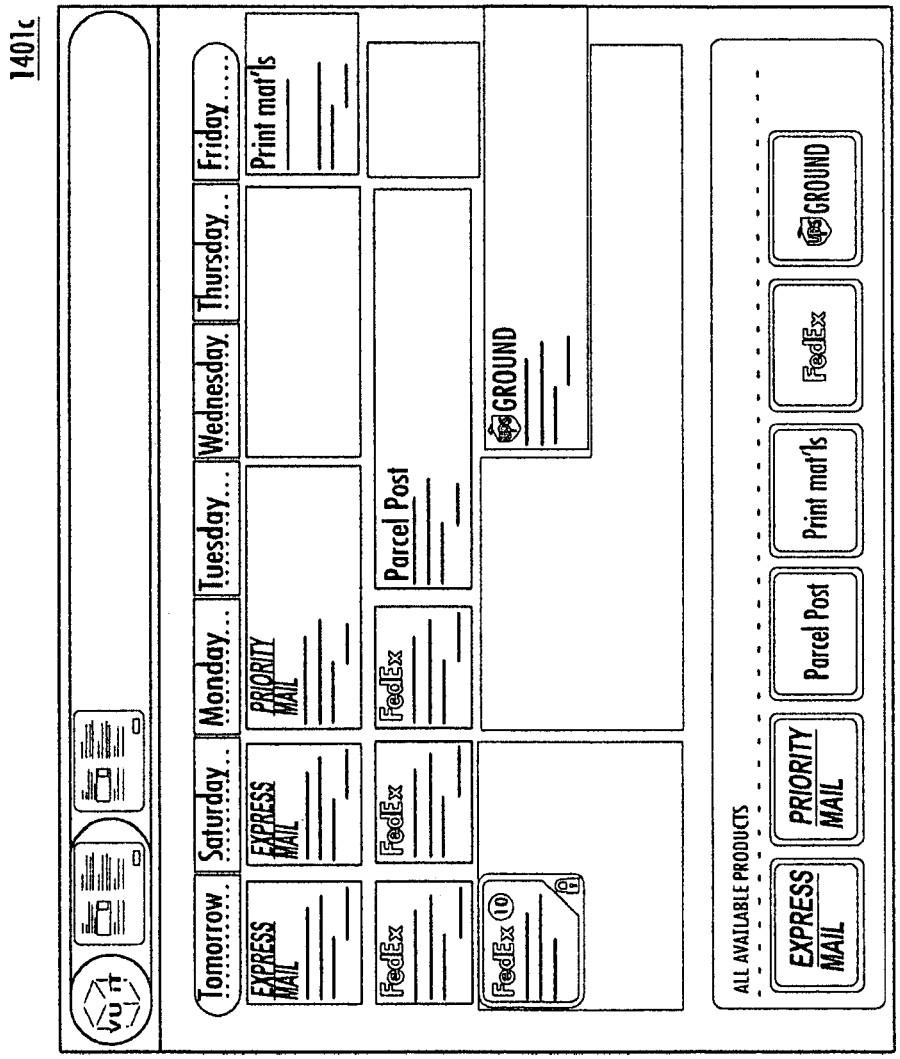
Figure 15B:
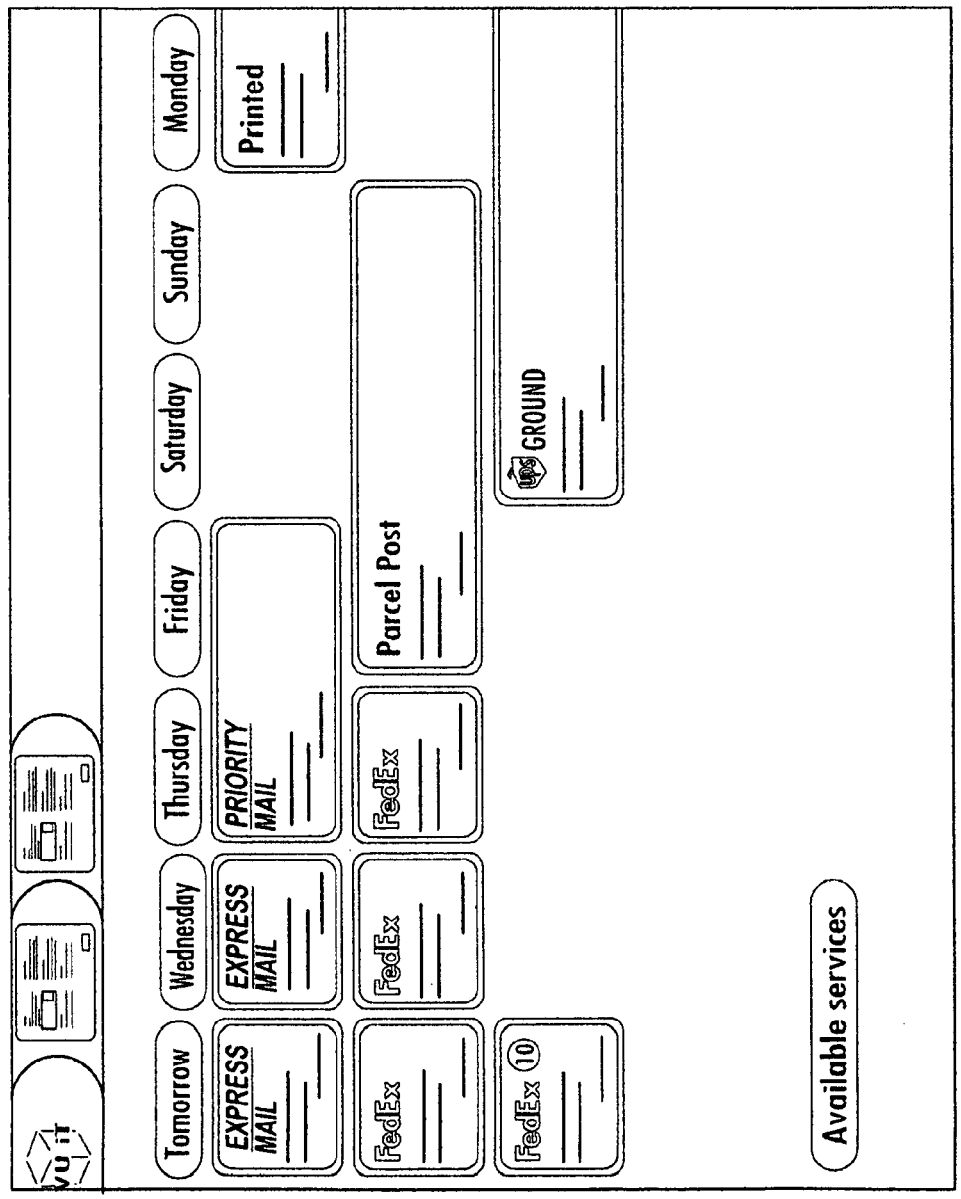
Figure 15C:
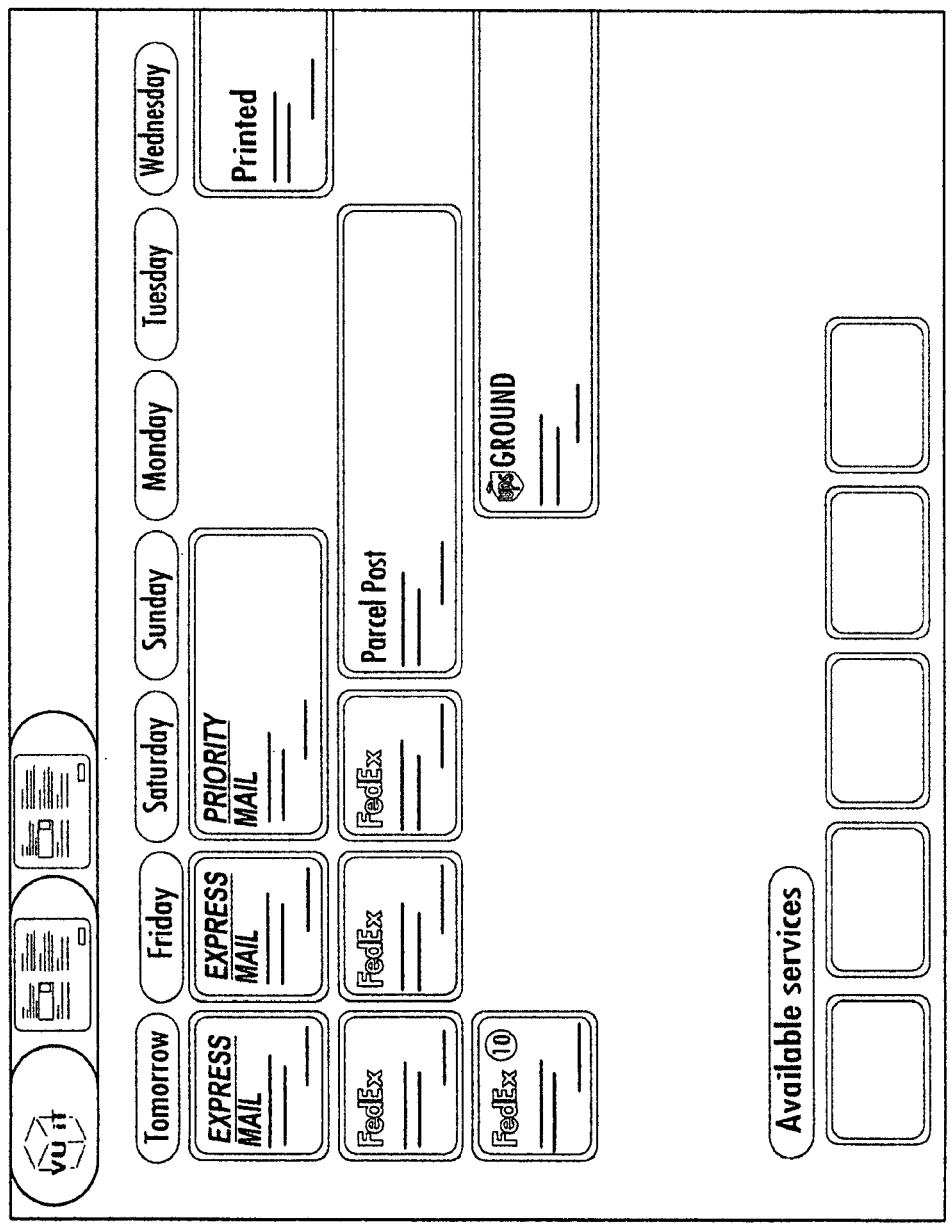

The system can use such techniques to generate multiple service options based on the captured information and/or user requirements. As shown in FIGS. 15*a*, 15*b*, and 15*c*, these options may be organized and presented (e.g. to a customer or salesperson) in a convenient fashion using, for example, a touch screen interface.

Figure 16:
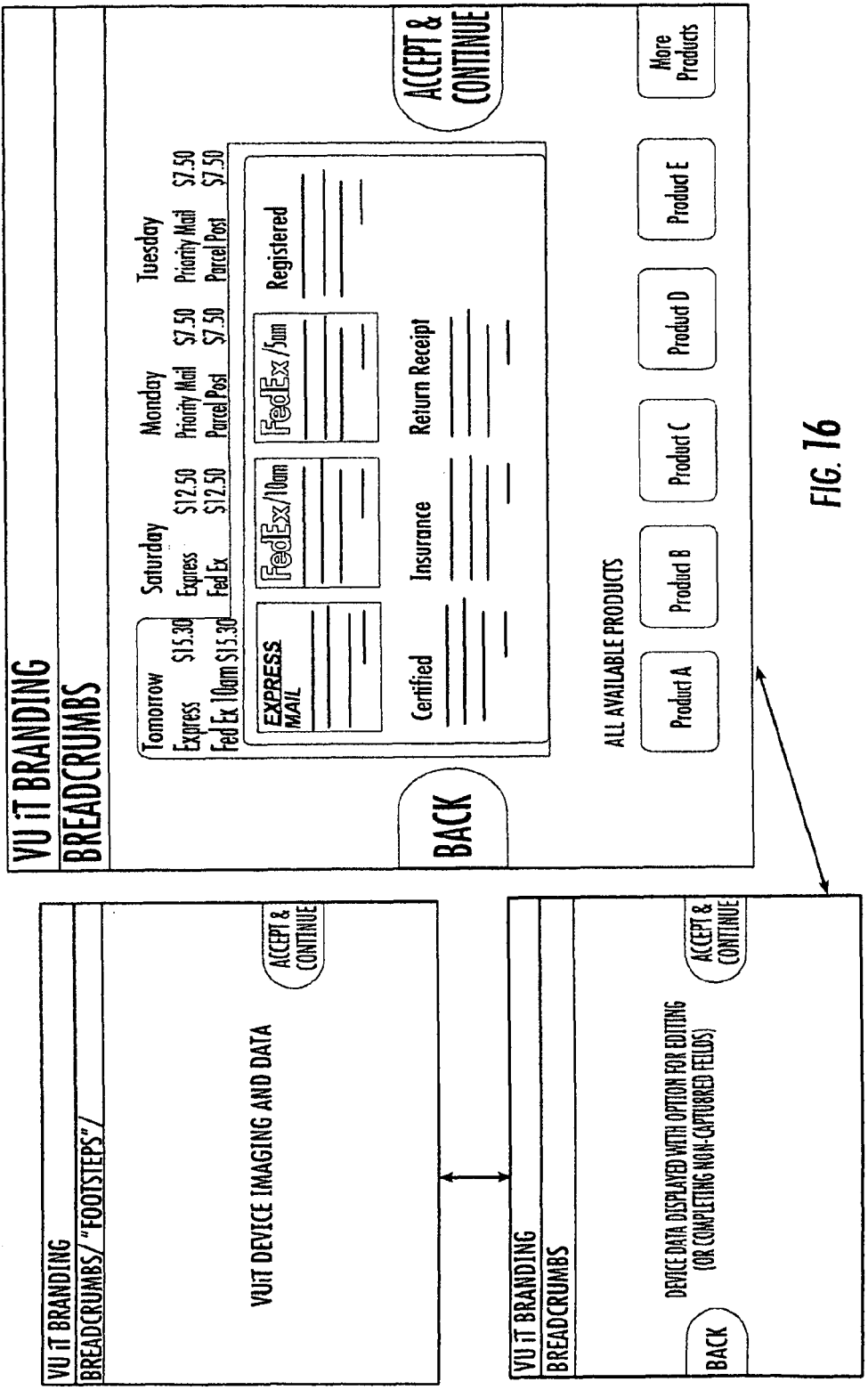

FIG. 16 shows another example of a sequence of GUI screens.

In some embodiments, USB and Ethernet connections will be provided. Some embodiments will include additional USB, keyboard, and display connections. In some embodiments the firmware/software will support Simple Object Access Protocol/Service Oriented Architecture Protocol (SOAP) calls. Some embodiments will support a Web Server, rating engine, and/or maintenance facilities.

In some embodiments, an embedded computing platform, e.g. processor 114, contained in or peripheral to the enrolment device 100 allows it to operate as a stand alone postage meter. In some embodiments, the enrolment device 100 brings an intelligent item assessment capability to the corporate mail room. Shippers can be assured that the services they require will be correctly calculated and that items shipped will be in full compliance with the terms of service. Additionally, in some embodiments, the enrolment device will be able to communicate directly with the post office allowing billing directly from SAP, sales and marketing support, and convenient automatic scheduling of pick ups. Rates and incentives can be system wide, applied to a subset of customers, or even be specific to an individual customer.

Display and Control Functions

In some embodiments, the main on-device control function is presented by three OLED captioned buttons. The captions are dynamic and are managed by the firmware. An application programming interface (API) allows (possibly external) applications to control the buttons when the firmware is not using them. Operational, maintenance, and diagnostic functions are supported. If required, the extension arm can have a display attached, for example, if required by local regulation.

Additional Features

Various embodiments include one or more of the following features:

The embedded computing platform will have a PSD (Postal Security Device) built in.

The enrolment device will use available information (e.g. from an intranet or internet connection) to establish its location.

The embedded electronics will have a secure "black box" data recorder for audit and control purposes. This capability can be remotely accessed (e.g. via an intranet or internet connection).

Cryptographic capabilities consistent with export regulations will be available.

User management and tokens will be supported. Departmental accounting is possible. SAP codes will be supported.

Work Flow Systems Integration and support for manufacturing systems will be available.

Dashboard facilities with remote access will be supported.

Automatic integration with dispatch centers will be supported.

Embedded wireless broadband will be available.

Ability to read full size checks and bill payment forms.

Ability to capture signed documents for onward processing or item truncation.

Extensive device support including but not limited to;

Card Readers,
Printers,
Postal Label Printers,
Interactive Customer Display,
Pin Input devices,
Keyboards.

Exemplary Applications

Based on the ability to provide the general business benefits described above, the devices techniques described have commercial applications in the following market segments:

Managed Content

The evolution of the letter stream as a facility to carry packets suitable for delivery to unattended delivery points requires the addition of infrastructure allowing that activity. The enrolment of such items requires the ability to capture all of the information required for all items to be sent through the mail stream as well as new value added services. The ability to tag items with services such as cold stream, work flow notifications, risk management, call center notifications, and conditional deliveries will be required. In some embodiments, the enrollment device would be located in locations such as pharmacies or dedicated shipping centers where prescriptions were being prepared for shipment to patients.

Postal Operators & Courier Companies:

For the highly automated postal operators and courier companies, the enrollment device provides automated "front end" data collection, leveraging their existing investment in systems and technology.

For the low or non-automated strata of postal operators and courier companies, the enrollment device provides a low-cost automation solution for the capture and management of shipment related information at their counter locations, eliminating a range of paper-based processes and enabling integration with 3rd party carriers and systems.

The Pharmaceutical Industry:

The enrollment device provides the pharmaceutical industry with a means of automating the Provenance and Chain of Custody aspects of their business.

Civil Defense:

The enrollment device provides a mechanism for the mass distribution of products and services with a clear Chain of Custody from point of Induction.

Goods Distribution Companies:

It is anticipated that Goods Distribution companies will benefit from the ability to use the enrollment device to manage and prepare their "one-to many" shipments.

One or more or any part thereof of the techniques described above can be implemented in computer hardware or software, or a combination of both. The methods can be implemented in computer programs using standard programming techniques following the examples described herein. Program code is applied to input data to perform the functions described herein and generate output information. The output information is applied to one or more output devices such as a display monitor. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits preprogrammed for that purpose.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The computer program can also reside in cache or main memory during program execution. The analysis method can also be implemented as a computer-readable storage medium, configured with a computer program, where the storage medium so configured causes a computer to operate in a specific and predefined manner to perform the functions described herein.

A number of embodiments of the invention have been described. Nevertheless, it will be understood that various modifications may be made without departing from the spirit and scope of the invention.

As used herein the terms "light" and "optical" and related terms are to be understood to include electromagnetic radiation both within and outside of the visible spectrum, including, for example, ultraviolet and infrared radiation.

The examples above refer to a package received by the enrollment device. It is to be understood that suitable item may be received and enrolled, including: mail pieces, pharmaceutical items, evidentiary items, documents, containers of any type, etc.

A number of references have been incorporated in the current application. In the event that the definition or meaning of any technical term found in the references conflicts with that found herein, it is to be understood that the meaning or definition from the instant application holds.

What is claimed is:

1. An apparatus for enrolling a package on a receiving surface comprising:
   the receiving surface;
   at least one weight sensor in communication with the receiving surface which generates a weight signal indicative of the weight of the package;
   a video camera unit positioned to view the package, wherein the camera unit:
   generates a video signal indicative of an image of the package on the receiving surface; and
   a processor in communication with the at least one weight sensor and the one video camera unit, said processor comprising:
   a weight module which produces, in response to the weight signal, weight data indicative of the weight of the package;
   a dimension capture module which produces, in response to the video signal, dimension data indicative of the size of the package, wherein the dimension capture module comprises a tracking module which produces, in response to the video signal, tracking data indicative of the presence and location of the package on the receiving surface, wherein the tracking information comprises length and width dimension data indicative of the size of the package along two axes lying in a plane parallel to the receiving surface; and
   a recognition module which produces, in response to the video signal, character data indicative of one or more characters present on the package;
   wherein the video signal comprises a stream of two dimensional image frames.

2. The apparatus of claim 1, wherein the tracking information further comprises height dimension data indicative of the size of the package along an axis transverse to the plane parallel to the receiving surface.

3. The apparatus of claim 2, wherein the camera unit comprises a stereoscopic imager.

4. The apparatus of claim 3, wherein the dimension capture module produces, in response to a stereoscopic video signal from the stereoscopic imager, the height dimension data.

5. The apparatus of claim 1, wherein the dimension capture module comprises an edge finder module which produces, in response to the video signal, edge data indicative of the location of one or more edges of the package.

6. The apparatus of claim 5, wherein the dimension capture module comprises at least one chosen from the group consisting of: a frame differencing module which generates two dimensional difference images from two or more two dimensional images of the video signal; and a color masking module configured to generate information indicative of the presence or location of the package based on color information from the video signal.

7. The apparatus of claim 5, wherein the dimension capture module comprises a Hough transformation module which applies the Hough transformation to one or more images from the video signal, and analyzes the transformed images to determine information indicative of the size or location of edges on the package.

8. The apparatus of claim 1 wherein the recognition module comprises:
- an image processing module for processing one or more two dimensional images from the video signal; and
- an analysis module which analyzes the one or more processed images to produce the character data indicative of one or more characters present on the package.

9. The apparatus of claim 8, wherein the image processing module comprises at least one chosen from the list consisting of:
- a color manipulating module for modifying the color of the one or more images;
- a linear filter module for applying a linear image filter to the one or more images; and
- a morphological filter module for applying one or more morphological operations to the one or more images.

10. The apparatus of claim 8, wherein the image processing module comprises an image segmentation module for segmenting the one or more images into one or more regions of interest based on the content of the images.

11. The apparatus of claim 8, wherein the image processing module comprises an image rotation module which rotates at least a portion of the one or more images.

12. The apparatus of claim 11, wherein the image rotation module is in communication with the dimension capture module, and rotates at least a portion of the one or more images based on information from the dimension capture module indicative of the location of the package.

13. The apparatus of claim 1, wherein the camera unit comprises at least two cameras each generating a respective video signal, and wherein
- the cameras have least partially overlapping fields of view, and
- the processor comprises an image stitching module which, in response to the respective video signals, combines overlapping two dimensional images from the at least two cameras to produce a single image of the combined field of view of the cameras.

14. The apparatus of claim 1, wherein substantially all locations on the receiving surface fall within the field of view of the camera unit.

15. The apparatus of claim 14, wherein the camera unit includes only a single camera.

16. The apparatus of claim 1, comprising an integrated housing comprising the receiving surface and processor.

17. The apparatus of claim 16, further comprising a support arm extending between a proximal end connected to the housing and a distal end positioned above the receiving surface, said distal end comprising at least one chosen from the group consisting of: a range finder, and the camera unit.

18. The apparatus of claim 1, wherein the at least one weight sensor comprises: a load cell, a MEMs device, a piezoelectric device, a spring scale, and a balance scale.

19. The apparatus of claim 1, further comprising a postal meter in communication with the processor.

20. The apparatus of claim 1, wherein the camera unit comprises an infrared camera.

* * * * *